United States Patent
Evans et al.

(10) Patent No.: US 8,868,346 B2
(45) Date of Patent: Oct. 21, 2014

(54) CORRECTION FOR LOW POROSITY EFFECTS ON NEUTRON GAMMA DENSITY

(75) Inventors: Michael Evans, Missouri City, TX (US); Marie-Laure Mauborgne, Fontenay aux Roses (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 532 days.

(21) Appl. No.: 13/181,584

(22) Filed: Jul. 13, 2011

(65) Prior Publication Data

US 2012/0016588 A1 Jan. 19, 2012

Related U.S. Application Data

(60) Provisional application No. 61/363,664, filed on Jul. 13, 2010, provisional application No. 61/429,237, filed on Jan. 3, 2011.

(51) Int. Cl.
*G01V 5/10* (2006.01)

(52) U.S. Cl.
CPC ........................................ *G01V 5/104* (2013.01)
USPC ....................... 702/8; 702/6; 702/13; 702/180

(58) Field of Classification Search
USPC ............. 702/6, 8, 13, 180; 250/269.2, 269, 4, 250/269.5, 6, 269.7
See application file for complete search history.

(56) References Cited

U.S. PATENT DOCUMENTS

| 4,760,252 A | 7/1988 | Albats |
| 6,207,953 B1 * | 3/2001 | Wilson ........................ 250/269.4 |
| 7,642,507 B2 * | 1/2010 | Radtke et al. .................. 250/256 |
| 2006/0284066 A1 * | 12/2006 | Jacobson ..................... 250/269.6 |

* cited by examiner

*Primary Examiner* — Michael Nghiem
*Assistant Examiner* — Ivan Rabovianski
(74) *Attorney, Agent, or Firm* — Stephanie Chi; Brigitte Echols

(57) ABSTRACT

Systems, methods, and devices are provided to determine an accurate neutron-gamma density (NGD) measurement for a broad range of formations, including low-hydrogen-index or low-porosity formations and formations with heavy elements. For example, such an NGD measurement may be obtained by emitting neutrons into a formation such that some of the neutrons inelastically scatter off elements of the formation and generate inelastic gamma rays. The neutrons and inelastic gamma rays that return to the downhole tool may be detected. Some characteristics of certain formations are believed to affect the fast neutron transport of the formations. Thus, if a formation has one or more of such characteristics, a correction may be applied to the count rate of neutrons, the count rate of inelastic gamma rays, or the neutron transport correction function, upon which the neutron-gamma density (NGD) may be determined.

14 Claims, 10 Drawing Sheets

CORRECTION FOR LOW POROSITY EFFECTS ON NEUTRON GAMMA DENSITY

FIELD

The present disclosure relates generally to neutron-gamma density (NGD) well logging and, more particularly, to techniques for obtaining an accurate NGD measurement in certain formations.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Formation density is a measurement frequently obtained during well logging. One manner of determining the formation density may be referred to as a gamma density measurement, which involves detecting the extent to which gamma rays scatter through the formation. Conventionally, obtaining a gamma density measurement has involved irradiating the formation with gamma rays using a radioisotopic source (e.g., $^{137}$Cs or $^{241}$AmBe). These gamma rays may Compton scatter off the electrons present in the formation. Depending on the amount of Compton scattering, some of these gamma rays may be detected by a gamma ray detector spaced some distance from the gamma ray source. Since the concentration of electrons in the formation is proportional to the atomic number of the elements of the formation, and the degree to which the gamma rays Compton scatter and are detected by the gamma ray detector relates to the electron concentration, the density of the formation may be determined based on the count rate of gamma rays detected.

Using radioisotopic sources in a downhole tool may be undesirable, so techniques have been developed to generate photons for a formation density measurement without radioisotopic gamma ray sources. One such technique is referred to as a neutron-gamma density (NGD) measurement, as distinguished from a conventional gamma-gamma density (GGD) measurement. An NGD measurement involves emitting neutrons into the formation using a neutron generator. Some of these neutrons may inelastically scatter off certain elements in the formation, generating inelastic gamma rays that may enable a formation density determination. Although an NGD measurement based on these gamma rays may be accurate in some formations, the NGD measurement may be less accurate in other formations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for determining an accurate neutron-gamma density (NGD) measurement for a broad range of formations, including low-hydrogen-index or low-porosity formations and formations with heavy elements. For example, such an NGD measurement may be obtained by emitting neutrons into a formation such that some of the neutrons inelastically scatter off elements of the formation and generate inelastic gamma rays. The neutrons and inelastic gamma rays that return to the downhole tool may be detected. Some characteristics of the formation are believed to affect the fast neutron transport of the formation. Thus, if the formation has such characteristics, a correction may be applied to the count rate of neutrons, the count rate of inelastic gamma rays, or the neutron transport correction function, upon which the neutron-gamma density (NGD) may be determined.

In another example, a downhole tool may include a neutron generator, a neutron detector, two gamma ray detectors, and data processing circuitry. The neutron generator may emit neutrons into a formation at an energy sufficient to cause some of the neutrons to inelastically scatter off elements of the formation, creating inelastic gamma rays. The neutron detector may detect a count rate of neutrons that return to the downhole tool, while the gamma ray detectors may detect first and second count rates of inelastic gamma rays that Compton scatter through the formation to reach the downhole tool. The data processing circuitry may receive the count rate of neutrons, the first count rate of inelastic gamma rays, and the second count rate of inelastic gamma rays, using them to determine a neutron gamma density that is accurate for low-hydrogen-index or low-porosity formations and formations with heavy elements.

By way of example, the data processing circuitry may determine an apparent porosity of the formation or an estimate of a fast neutron signal that would be detected by a fast neutron detector if such a fast neutron detector were present in the downhole tool. This estimate of the fast neutron signal may be determined based at least in part on the count rate of neutrons, the first count rate of inelastic gamma rays, and/or the second count rate of inelastic gamma rays. The data processing circuitry may apply a correction to the count rate of neutrons, the count rate of inelastic gamma rays, or and/or neutron transport correction function, when the apparent porosity of the formation is less than a limit or when the estimate of the fast neutron transport of the formation is outside a limit. Thereafter, the data processing circuitry may determine a density of the formation based at least in part on the corrected count rate of neutrons, inelastic gamma rays, and/or the neutron transport correction function.

Technical effects of the present disclosure include the accurate determination of a neutron-gamma density (NGD) measurement for a broad range of formations, including formations with low hydrogen index or low porosity and formations with heavy elements. These NGD measurements may remain accurate even when the configuration of a downhole tool used to obtain the neutron count rates and gamma ray count rates used in the NGD measurement does not have an optimal configuration. Thus, despite the lack of a fast neutron detector or despite that a neutron detector may be placed in a suboptimal spacing from the neutron source, an accurate NGD measurement still may be obtained using the systems and techniques disclosed above.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
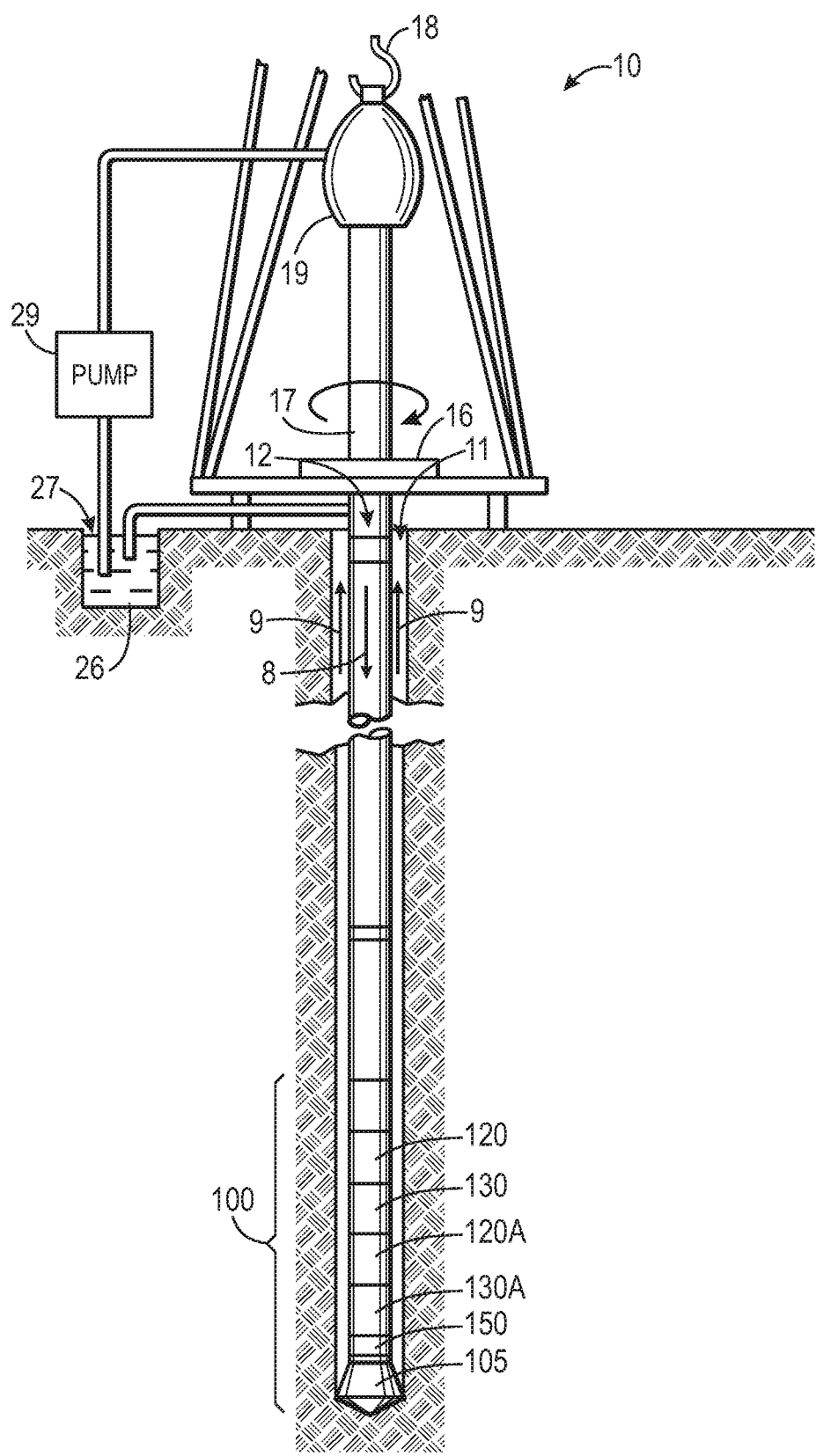
FIG. 1 is a schematic diagram of a wellsite system employing a neutron-gamma density (NGD) system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions can be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit(s) of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to systems and techniques for obtaining a neutron-gamma density (NGD) measurement that is accurate for various formations including low-porosity formations and formations with heavy elements. In general, a downhole tool for obtaining such an NGD measurement may include a neutron source, at least one neutron detector, and two gamma ray detectors. While the downhole tool is within a borehole of a formation, the neutron source may emit fast neutrons of at least 2 MeV into the formation for a brief period of time, referred to herein as a "burst gate," during which the neutrons may inelastically scatter off certain elements in the formation (e.g., oxygen) to generate gamma rays. The gamma ray detectors of the downhole tool may detect these inelastic gamma rays. The NGD measurement of the formation may be a function of a count rate of these inelastic gamma rays, corrected by a neutron transport correction function based on a neutron count rate from the neutron detector(s). Such a neutron transport correction function generally may accurately account for the neutron transport of most formations commonly encountered in an oil and/or gas well, resulting in an accurate NGD measurement. As used herein, an "accurate" NGD measurement may refer to an NGD measurement that is within about 0.03 g/cc the true density of a formation.

It is believed that neutron counts from some downhole tool configurations may not accurately account for fast neutron transport in certain formations. For instance, when the downhole tool does not include a fast neutron detector, thermal or epithermal neutron detectors may be used to estimate the fast neutron distribution, but count rates from thermal or epithermal neutron detectors may not always accurately reflect the fast neutron transport of some formations in the same way a fast neutron detector would. Moreover, the placement of such thermal and/or epithermal neutron detectors in the downhole tool may involve a variety of considerations for NGD, as well as many other well logging measurements. As such, some of these thermal or epithermal neutron detectors may not be at a location within the downhole tool that is best suited to detect count rates of neutrons so as to accurately reflect the neutron transport of some formations, when applied in a neutron transport correction function. These situations may arise when an NGD measurement is obtained in certain formations including formations with low porosity or low hydrogen index, or formations with heavy elements beyond some concentration limit.

The nature of these formations will now be briefly described. As should be appreciated, a formation with low porosity has pore spaces that are relatively small. A low-porosity formation will often also have a low hydrogen index, since the pores of a low-porosity formation may have little space for hydrogen (e.g., in water, oil, and/or gas). Some formations, such as shales and clays, may contain hydrogen independent of their pore spaces. For these hydrogen-containing formations, low porosity will not necessarily result in a low hydrogen index because hydrogen elsewhere from the pores of formation will be reflected in the hydrogen index determination. Low-porosity and low-hydrogen-index formations are believed to have fast neutron transports that differ in similar ways from many other formations and that may benefit from the present techniques. As such, the terms "low porosity" and "low hydrogen index" may be used largely interchangeably throughout the present disclosure. Formations with heavy elements, such as sandstone with hematite or alumina, also may have fast neutron transports that differ in similar ways from many other formations. As used herein, the term "formation with heavy elements" refers to a formation with a concentration of elements of atomic mass of 20 or greater (e.g., shales containing high concentrations of iron or aluminum) beyond a concentration limit.

According to embodiments of the present disclosure, when an NGD measurement is obtained in a formation, such as a low-porosity or low-hydrogen-index formation, or a formation with heavy elements beyond some concentration limit, having characteristics that detectably affect the fast neutron transport in a way that differs from other formations, the neutron count rate(s), the gamma ray count rate(s) used for the NGD measurement, and/or a neutron transport correction function may be modified to more accurately account for the fast neutron transport of the formation. These or any other suitable corrections may be applied when the formation has one or more characteristics (e.g., low porosity or concentration of heavy elements) that are expected to cause the count rate of neutrons and/or neutron-induced gamma rays not to accurately correspond to a fast neutron transport of the formation, when the count rate of neutrons and/or gamma rays is applied in a neutron transport correction function.

With the foregoing in mind, FIG. 1 illustrates a wellsite system in which the disclosed NGD system can be employed. The wellsite system of FIG. 1 may be onshore or offshore. In the wellsite system of FIG. 1, a borehole 11 may be formed in subsurface formations by rotary drilling using any suitable technique. A drill string 12 may be suspended within the borehole 11 and may have a bottom hole assembly 100 that includes a drill bit 105 at its lower end. A surface system of the wellsite system of FIG. 1 may include a platform and derrick assembly 10 positioned over the borehole 11, the platform and derrick assembly 10 including a rotary table 16, kelly 17, hook 18 and rotary swivel 19. The drill string 12 may be rotated by the rotary table 16, energized by any suitable means, which engages the kelly 17 at the upper end of the drill string 12. The drill string 12 may be suspended from the hook 18, attached to a traveling block (not shown), through the kelly 17 and the rotary swivel 19, which permits rotation of the drill string 12 relative to the hook 18. A top drive system could alternatively be used, which may be a top drive system well known to those of ordinary skill in the art.

In the wellsite system of FIG. 1, the surface system may also include drilling fluid or mud 26 stored in a pit 27 formed at the well site. A pump 29 may deliver the drilling fluid 26 to the interior of the drill string 12 via a port in the swivel 19, causing the drilling fluid to flow downwardly through the drill string 12 as indicated by the directional arrow 8. The drilling fluid 26 may exit the drill string 12 via ports in the drill bit 105, and circulating upwardly through the annulus region between the outside of the drill string 12 and the wall of the borehole 11, as indicated by the directional arrows 9. In this well known manner, the drilling fluid 26 lubricates the drill bit 105 and carries formation cuttings up to the surface, as the fluid 26 is returned to the pit 27 for recirculation.

The bottom hole assembly 100 of the wellsite system of FIG. 1 may include a logging-while-drilling (LWD) module 120 and/or a measuring-while-drilling (MWD) module 130, a roto-steerable system and motor 150, and the drill bit 105. The LWD module 120 can be housed in a special type of drill collar, as is known in the art, and can contain one or more known types of logging tools. It will also be understood that more than one LWD module can be employed, as generally represented at numeral 120A. As such, references to the LWD module 120 can alternatively mean a module at the position of 120A as well. The LWD module 120 may include capabilities for measuring, processing, and storing information, as well as for communicating with surface equipment. The LWD module 120 may be employed to obtain a neutron-gamma density (NGD) measurement, as will be discussed further below.

The MWD module 130 can also be housed in a special type of drill collar, as is known in the art, and can contain one or more devices for measuring characteristics of the drill string and drill bit. It will also be understood that more than one MWD can be employed, as generally represented at numeral 130A. As such, references to the MWD module 130 can alternatively mean a module at the position of 130A as well. The MWD module 130 may also include an apparatus for generating electrical power to the downhole system. Such an electrical generator may include, for example, a mud turbine generator powered by the flow of the drilling fluid, but other power and/or battery systems may be employed additionally or alternatively. In the wellsite system of FIG. 1, the MWD module 130 may include one or more of the following types of measuring devices: a weight-on-bit measuring device, a torque measuring device, a vibration measuring device, a shock measuring device, a stick slip measuring device, a direction measuring device, and/or an inclination measuring device.

Figure 2:
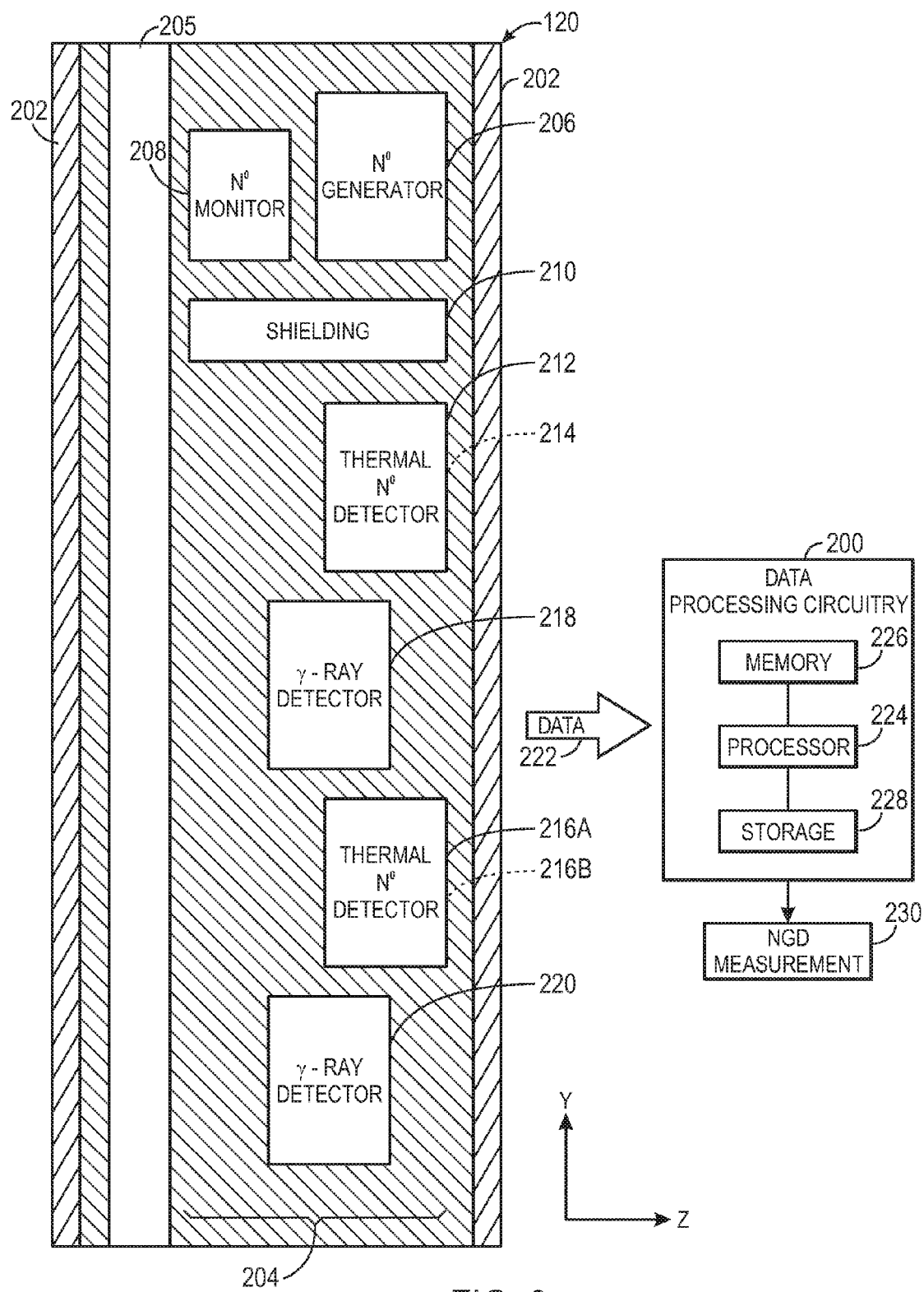
FIGS. 2 and 3 are schematic block diagrams representing an NGD system capable of accurately measuring density in a low-porosity formation or a formation that includes heavy elements, in accordance with an embodiment.
Figure 3:
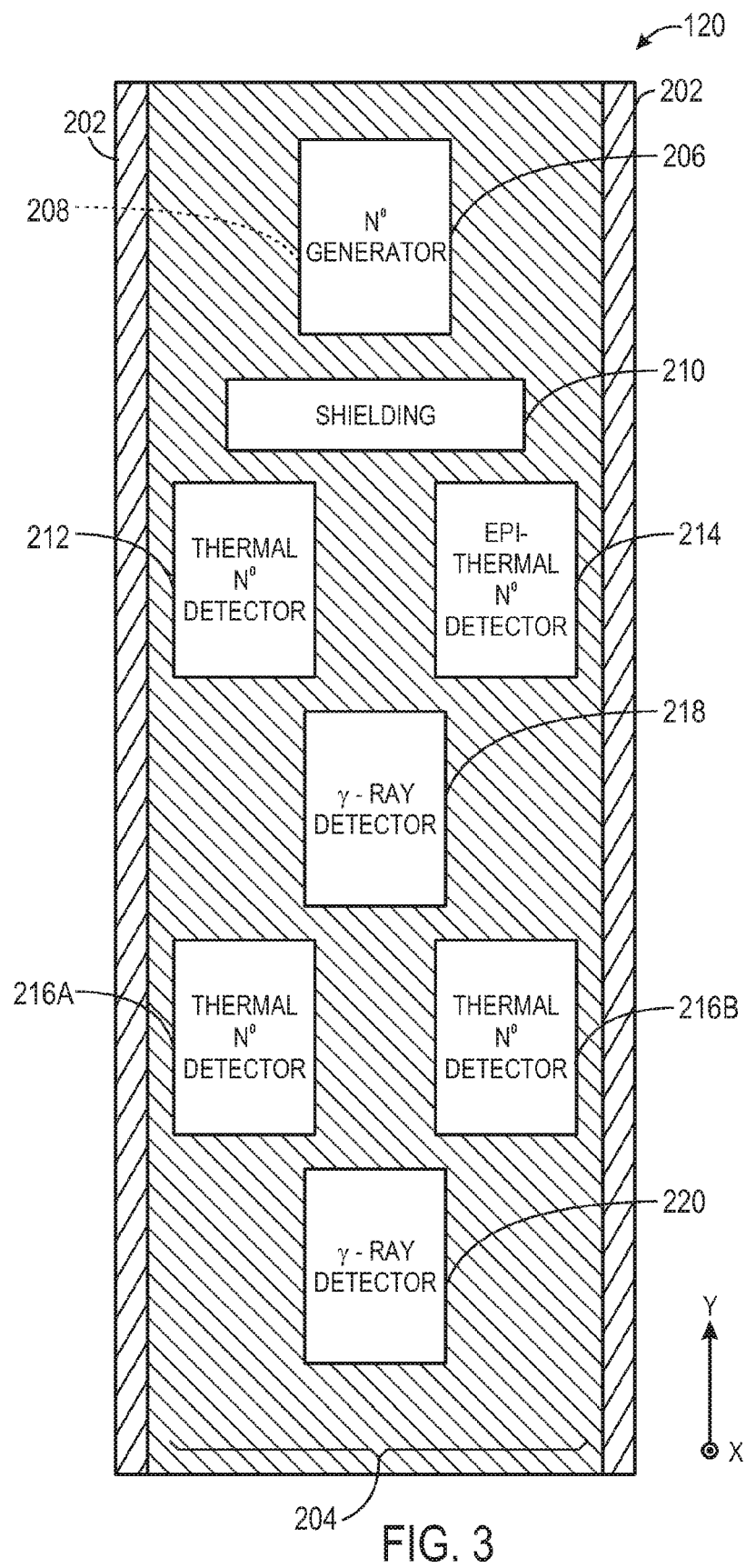

The LWD module 120 may be used in a neutron-gamma density (NGD) system, as shown in FIGS. 2 and 3, that can accurately measure a density in formations including low-porosity or low-hydrogen-index formations and/or formations with heavy elements. In particular, FIGS. 2 and 3 present schematic block diagram side views of the LWD module 120 respectively rotated by 90 degrees from one another. It should be understood that the LWD module 120 is intended to represent one example of a general configuration of an NGD tool, and that other suitable NGD tools may include more or fewer components and may be configured for other means of conveyance. Indeed, other embodiments of NGD tools employing the general configuration of the LWD module 120 are envisaged for use with any suitable means of conveyance, such as wireline, coiled tubing, logging while drilling (LWD), and so forth. The NGD system of FIGS. 2 and 3 may include the LWD module 120 and associated data processing circuitry 200. Although the LWD module 120 and the data processing circuitry 200 are depicted as independent elements in FIG. 2, it should be appreciated that the data processing circuitry 200 may be implemented entirely within the LWD module 120, at the surface remote from the LWD module 120, or partly within the LWD module 120 and partly at the surface. By way of example, the LWD module 120 may represent a model of the EcoScope™ tool by Schlumberger.

The LWD module 120 may be contained within a drill collar 202 that encircles a chassis 204 and a mud channel 205. The chassis 204 may include a variety of components used for emitting and detecting radiation to obtain an NGD measurement. For example, a neutron generator 206 may serve as a neutron source that emits neutrons of at least 2 MeV, which is believed to be approximately the minimum energy to create gamma rays through inelastic scattering with formation elements. By way of example, the neutron generator 206 may be an electronic neutron source, such as a Minitron™ by Schlumberger Technology Corporation, which may produce pulses of neutrons through deuteron-deuteron (d-D) and/or deuteron-triton (d-T) reactions. Thus, the neutron generator 206 may emit neutrons around 2 MeV or 14 MeV, for example. A neutron monitor 208 may monitor the neutron emissions from the neutron generator 206. By way of example, the neutron monitor 208 may be a plastic scintillator and photomultiplier that primarily detects unscattered neutrons directly emitted from the neutron generator 206, and thus may provide a count rate signal proportional to the neutron output rate from the rate of neutron output of the neutron generator 206. Neutron shielding 210, which may include lead, for example, may largely prevent neutrons from the neutron generator 206 from passing internally through the LWD module 120 toward various radiation-detecting components on the other side of the shielding 210.

As illustrated in FIGS. 2 and 3, the LWD module 120 can include two near neutron detectors, namely, a thermal neutron detector 212 and an epithermal neutron detector 214. Two far thermal neutron detectors 216A and 216 B may be located at a spacing farther from the neutron generator 206 than the neutron detectors 212 and 214. For example, the near neutron detectors 212 and 214 may be spaced approximately 10-14 in. from the neutron generator 206, and the far neutron detectors 216A and 216B may be spaced 18-28 in. from the neutron generator 206. A short spacing (SS) gamma ray detector 218 may be located between the near neutron detectors 212 and 214 and the far neutron detectors 216A and 216B. A long spacing (LS) gamma ray detector 220 may be located beyond the far neutron detectors 216A and 216B, at a spacing farther from the neutron generator 206 than the gamma ray detector 218. For example, the SS gamma ray detectors 218 may be spaced approximately 16-22 in. from the neutron generator 206, and the LS gamma ray detector 220 may be spaced approximately 30-38 in. from the neutron generator 206. Alternative embodiments of the LWD module 120 may include more or fewer of such radiation detectors, but generally may include at least two gamma ray detectors and at least one neutron detector.

The neutron detectors 212, 214, 216A, and/or 216B may be any suitable neutron detectors, such as $^3$He neutron detectors. To detect primarily epithermal neutrons, the epithermal neutron detector 214 may be surrounded by thermal neutron shielding, while the thermal neutron detectors 212, 216A, and/or 216B may not. In general, the detection of substantially only epithermal neutrons may allow the epithermal neutron detector 214 to measure the extent of a fast neutron distribution through most formations, and thus such a neutron count rate may be used to account for fast neutron transport through the formations in an NGD measurement. However, in formations with low hydrogen index (HI) or low porosity, the neutron detectors 212, 214, 216A, and/or 216B may not be spaced far enough from the neutron generator 206 to directly account for the fast neutron transport of such formations. As will be discussed below, for such low-porosity and/or low-hydrogen-index formations, an NGD measurement obtained using the LWD module 120 may be corrected to approximate that which would be expected if the neutron detectors 212, 214, 216A, and/or 216B were located at a spacing or spacings more appropriate for such formations.

Moreover, in formations with heavy elements, such as shales with high concentrations of iron or aluminum, the neutron detectors 212, 214, 216A, and/or 216B generally may not provide a neutron count rate that accurately reflects the fast neutron transport of such formations. Although it is believed that this deficiency could be addressed by using a fast neutron detector in the LWD module 120, it may be difficult to implement such a fast neutron detector in a downhole tool. For example, it may be difficult to find a suitable sensor capable of working downhole that has high sensitivity and that is compact enough to fit within the LWD module 120. As will be discussed below, for such formations with heavy elements, an NGD measurement obtained using the LWD module 120 may be corrected to approximate that which would be expected if the neutron detectors 212, 214, 216A, and/or 216B were fast neutron detectors.

The gamma ray detectors 218 and/or 220 may be scintillator detectors surrounded by neutron shielding. The neutron shielding may include, for example, $^6$Li, such as lithium carbonate ($Li_2CO_3$), which may substantially shield the gamma ray detectors 218 and/or 220 from thermal neutrons without producing thermal neutron capture gamma rays. The gamma ray detectors 218 and 220 may detect inelastic gamma rays generated when fast neutrons from the neutron generator 206 inelastically scatter off certain elements of a surrounding formation. As will be discussed below, a neutron-gamma density (NGD) measurement may be a function of the inelastic gamma ray counts obtained from the gamma ray detectors 218 and 220, corrected for the fast neutron transport of the formation by a fast neutron correction function. Using the systems and techniques disclosed herein, such an NGD measurement may remain substantially accurate regardless of whether the formation is a low-hydrogen-index or low-porosity formation or a formation with a high concentration of heavy elements or a formation that has one or more characteristics that may cause the count rate of neutrons not to accurately correspond to a fast neutron transport of the formation.

The count rates of gamma rays from the gamma ray detectors 218 and 220 and count rates of neutrons from the neutron detectors 212, 214, 216A, and/or 216B may be received by the data processing circuitry 200 as data 222. The data processing circuitry 200 may receive the data 222 and perform certain processing to determine one or more properties of the surrounding formation, such as formation density. The data processing circuitry 200 may include a processor 224, memory 226, and/or storage 228. The processor 224 may be operably coupled to the memory 226 and/or the storage 228 to carry out the presently disclosed techniques. These techniques may be carried out by the processor 224 and/or other data processing circuitry based on certain instructions executable by the processor 224. Such instructions may be stored using any suitable article of manufacture, which may include one or more tangible, computer-readable media to at least collectively store these instructions. The article of manufacture may include, for example, the memory 226 and/or the nonvolatile storage 228. The memory 226 and the nonvolatile storage 228 may include any suitable articles of manufacture for storing data and executable instructions, such as random-access memory, read-only memory, rewriteable flash memory, hard drives, and optical disks.

The LWD module 120 may transmit the data 222 to the data processing circuitry 200 via, for example, internal connections within the tool, a telemetry system communication uplink, and/or a communication cable. The data processing circuitry 200 may determine one or more properties of the surrounding formation. By way of example, such properties may include a neutron-gamma density (NGD) measurement of the formation. Thereafter, the data processing circuitry 200 may output a report 230 indicating the NGD measurement of the formation. The report 230 may be stored in memory or may be provided to an operator via one or more output devices, such as an electronic display.

Figure 4:
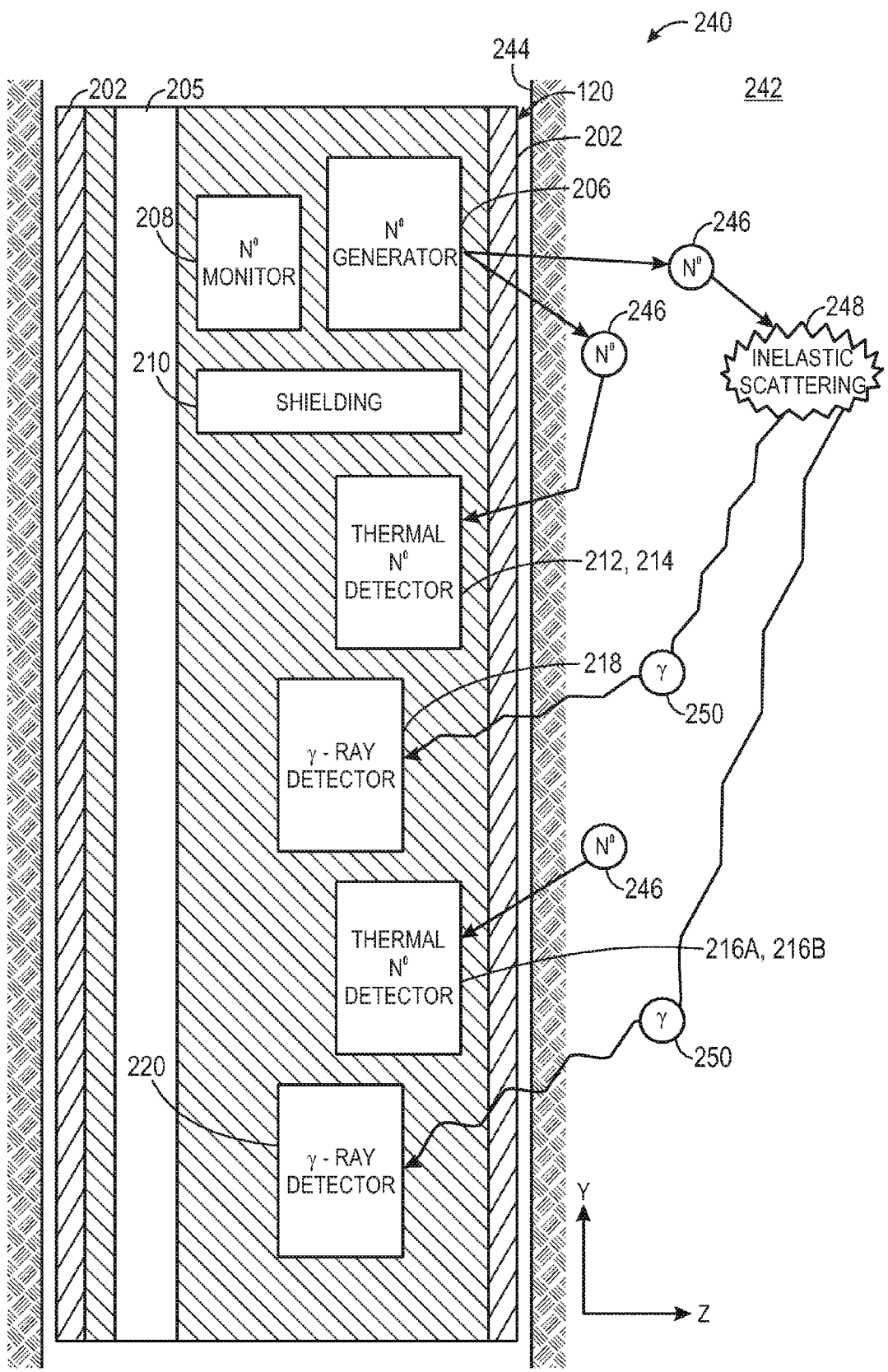
FIG. 4 is a schematic diagram representing well-logging operation using the NGD system of FIGS. 2 and 3, in accordance with an embodiment.

As shown in a neutron-gamma density (NGD) well-logging operation 240 of FIG. 4, the LWD module 120 may be used to obtain a neutron-gamma density (NGD) measurement that remains accurate in a variety of formations 242, including low-hydrogen-index or low-porosity formations and/or formations with heavy elements. As seen in FIG. 4, the NGD well-logging operation 240 may involve lowering the LWD module 120 into the formation 242 through a borehole 244. In the example of FIG. 4, the LWD module 120 can be lowered into the borehole 244 while drilling, and thus no casing may be present in the borehole 244. However, in other embodiments, a casing may be present. Although such casing could attenuate a gamma-gamma density tool that utilized a gamma ray source instead of a neutron generator 206, the presence of casing on the borehole 244 will not prevent the determination of an NGD measurement because neutrons 246 emitted by the neutron generator 206 may pass through casing without significant attenuation.

The neutron generator 206 may emit a burst of neutrons 246 for a relatively short period of time (e.g., 10 μs or 20 μs, or such) sufficient to substantially only allow for inelastic scattering to take place, referred to herein as a "burst gate." The burst of neutrons 246 during the burst gate may be distributed through the formation 242, the extent of which may vary depending upon the fast neutron transport of the formation 242. For some formations 242, counts of neutrons 246 obtained by the neutron detectors 212, 214, 216A, and/or 216B generally may accurately reflect the neutron transport of such formations 242. However, for other formations 242 such as low-hydrogen-index or low-porosity formations and/or formations with heavy elements, an additional correction may be need to more accurately account for the fast neutron transport of the formations 242.

Many of the fast neutrons 246 emitted by the neutron generator 206 may inelastically scatter 248 against some of the elements of the formation 242. This inelastic scattering 248 may produce inelastic gamma rays 250, which may be detected by the gamma ray detectors 218 and/or 220. By determining a formation density by taking a ratio of inelastic gamma rays 250 detected using the two gamma ray detectors 218 and 220 at different spacings from the neutron generator 206, lithology effects may be mostly eliminated.

From count rates of the inelastic gamma rays 250, one or more count rates of neutrons 246, and a determination of the neutron output of the neutron generator 206, the data processing circuitry 200 may determine an electron density $\rho_{electron}$ of the formation 242. In general, the electron density $\rho_{electron}$ may be calculated according to a relationship that involves a function of a net inelastic count rate $CR_\gamma^{inel}$, corrected by a neutron transport correction and a downhole tool calibration correction, which may be functions of one or more neutron count rate(s) $CR_{neutron}$ and the neutron output $N_S$ of the neutron generator 206, respectively. For example, the electron density $\rho_{electron}$ may calculation take the following form:

$$\frac{\log(CR_\gamma^{inel}) - f(CR_{neutron}) - \log(C_{cal} \cdot N_S)}{c_1} = \rho_{electron}, \quad (1)$$

where $CR_\gamma^{inel}$ is the net inelastic gamma ray count rate (i.e. the gamma ray count rate after subtraction of gamma rays arising from thermal and epithermal neutron capture), $CR_{neutron}$ represents a count rate of neutrons 246 from the neutron detectors 212, 214, 216A, and/or 216B, $f(CR_{neutron})$ represents a neutron transport correction, which may be any suitable function of the count rate of neutrons 246 that can correct for the fast neutron transport of the formation 242, $G_{cal}$ is a calibration constant determined experimentally using measurements in test formations of known composition, porosity and density, and $N_S$ is the neutron output of the neutron generator 206. The coefficient $c_1$ may be determined through characterization measurements and nuclear modeling.

For example, the neutron transport correction function $f(CR_{neutron})$ may take the following general form:

$$f(CR_{neutron}) d_1 + d_2 CR_{neutron} + d_3 CR_{neutron}^2,$$

where the coefficients $d_1$, $d_2$, and $d_3$ represent coefficients determined, for example, through characterization measurements and nuclear modeling.

In some embodiments, the neutron transport correction function may be described as follows:

$$f(CR_{neutron}) = e_1 \log(CR_{neutron}^{e_2} + e_3) \quad (2),$$

where the coefficients $e_1$, $e_2$, and $e_3$ are determined through characterization measurements and nuclear modeling.

For some formations 242, Equation (1) may result in an accurate density measurement. However, for other formations including low-hydrogen index or low-porosity formations 242 and/or formations 242 with relatively high concentrations of heavy elements (e.g., formations 242 having concentrations of heavy elements that may cause an NGD measurement to be inaccurate without additional correction), the neutron count rate from one or more of the neutron detectors 212, 214, 216A, and/or 216B is believed not to adequately account for the fast neutron transport of such formations 242. Thus, when an NGD measurement is being determined for such formations 242, the neutron count rate $CR_{neutron}$, the count rate of inelastic gamma rays $CR_\gamma^{inel}$, and/or the neutron transport correction function $f(CR_{neutron})$ may be corrected, as described by a flowchart 260 of FIG. 5.

Figure 5:
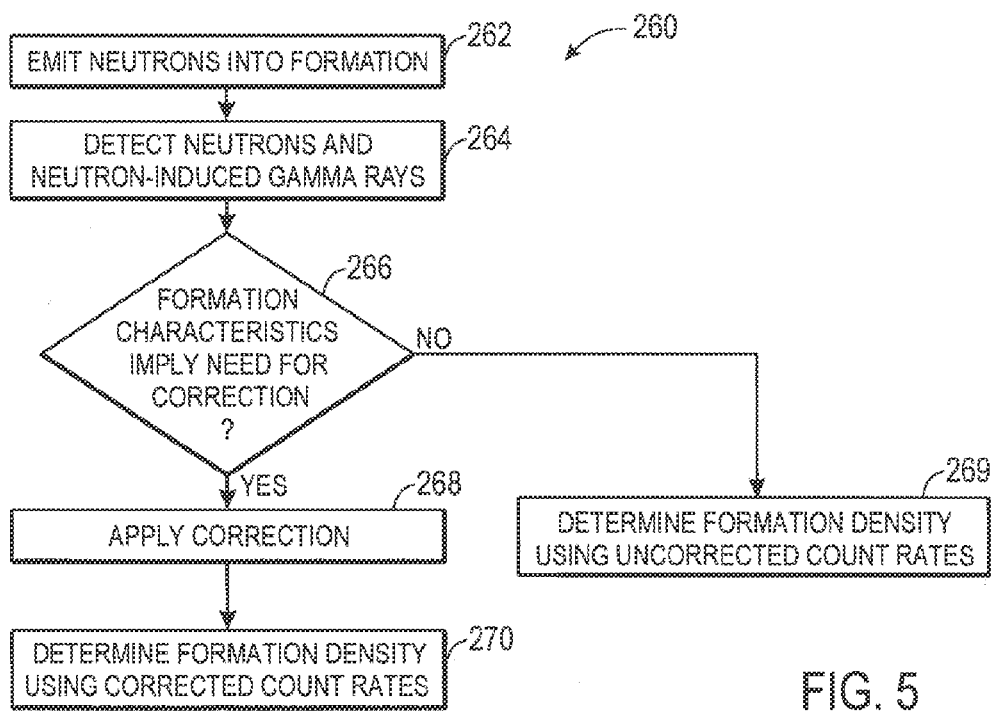
FIG. 5 is a flowchart describing an embodiment of a method for carrying out the well-logging operation of FIG. 4.

The flowchart 260 of FIG. 5 represents one embodiment of a method for carrying out the well-logging operation 240 of FIG. 4. While the LWD module 120 is in the borehole 244, the neutron generator 206 may emit a burst of neutrons 246 into the formation 242 (block 262). The neutrons 246 may inelastically scatter 248 off certain elements of the formation 242, generating inelastic gamma rays 250. Count rate(s) of neutrons 246 as well as count rate(s) of inelastic gamma rays 250 may be obtained (block 264). As discussed above with reference to Equation (1), such count rate(s) of neutrons 246 generally may relate well to the fast neutron transport of the formation 242 for some formations 242 encountered in an oil and/or gas well.

In other formations 242, however, it is believed that the count rate(s) of neutrons 246 and/or the count rate(s) of gamma rays 250 may not adequately account for the neutron transport of such formations 242. Thus, if the data processing circuitry 200 determines, using any suitable technique, that the formation 242 has one or more characteristics that imply a need for additional correction (e.g., low hydrogen index, low porosity, and/or containing a relatively high concentration of heavy elements) (decision block 266), the data processing circuitry 200 may undertake a suitable correction of the count rate(s) of neutrons 246, the count rate(s) of inelastic gamma rays 250, and/or the neutron transport correction function $f(CR_{neutron})$, or may provide a global correction that applies to some or all of these terms (block 268). That is, it should be understood that modifying any of the terms in the numerator of Equation (1) could change the resulting NGD determination. Thus, in block 268, the data processing circuitry 200 may undertake any suitable correction of any of the terms of Equation (1), including the introduction of one or more additional correction term(s), that may cause the NGD measurement to be generally accurate for the formation 242. As will be discussed below, some of these modifications may be relatively specific modifications to the count rates of neutrons 246, which may be adjusted according to a piecewise linear function of the porosity of the formation 242 (e.g., see Equation (3) below), or modifications to the count rate of gamma rays 250 when an inferred fast neutron count rate exceeds a limit, indicating a high concentration of heavy elements in the formation 242. However, it should be understood that the present embodiments are not intended to be limited only to these modifications. Indeed, the present embodiments are intended to cover any suitable modifications to an NGD determination that is generally accurate for some formations 242, the modifications taking place in the presence of formations 242 having certain other characteristics that cause the general NGD determination not be accurate in these formations 242.

If the data processing circuitry 200 does not determine that the formation 242 has such characteristics (decision block 266), the data processing circuitry 200 may not apply such a correction. In any case, the data processing circuitry 200 may subsequently determine an NGD measurement of the formation 242 using the determined (corrected—block 270—or uncorrected—block 269—) count rate(s) of neutrons 246, count rate(s) of inelastic gamma rays 250, and/or the neutron transport correction function $f(CR_{neutron})$. By way of example, the data processing circuitry 200 may determine the NGD measurement based on the relationship represented by Equation (1).

Figure 6:
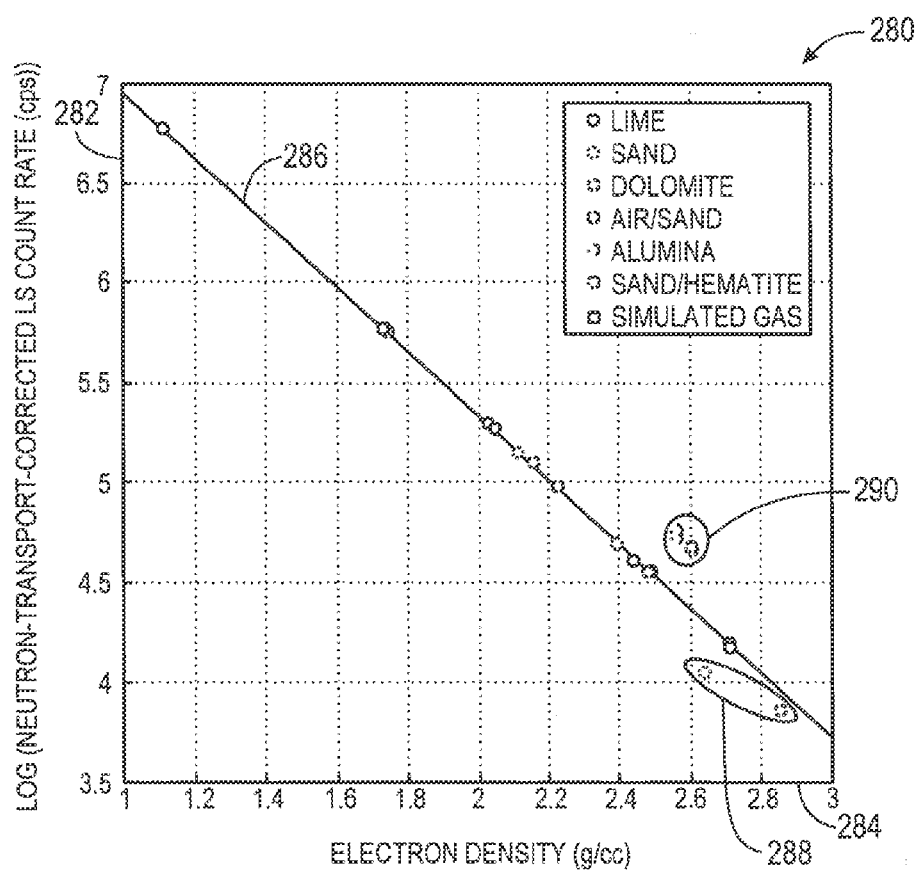
FIG. 6 is a crossplot comparing known formation density against formation density obtained without correcting neutron or gamma ray count rates, in accordance with an embodiment.

As mentioned above, although an NGD measurement such as determined using Equation (1) may accurately represent a density measurement for some formations 242, such an NGD measurement may not be accurate for other formations 242 such as formations having low hydrogen index, low porosity, and/or a relatively high concentration of heavy elements. This effect is apparent in a crossplot 280 of FIG. 6, which represents a crossplot modeling the known density of a variety of types of formations 242 against an NGD measurement for the formations 242 obtained using Equation (1) for which, for example, the count rate(s) of neutrons 246, the count rate(s) of inelastic gamma rays 250, and/or the neutron transport correction function $f(CR_{neutron})$ have not been corrected in the presence of, e.g., low hydrogen index, low porosity, or a high concentration of heavy elements. In the crossplot 280, an ordinate 282 represents the logarithm of a neutron-transport-corrected gamma ray count rate as detected by the LS gamma ray detector 218, and an abscissa 284 represents electron density of the formation 242 in units of g/cc. A legend indicates various types of formations 242 that have been modeled in the crossplot 280, including limestone, sandstone, dolomite, sandstone with air-filled pores, alumina, sandstone with hematite, and simulated gas. A line 286 represents an accurate correlation between the neutron-transport-corrected gamma ray count rate and the known formation density.

As seen in the crossplot 280, for certain formations 242, despite variations in the densities of the formations 242, the calculated logarithm of neutron-transport-corrected gamma ray count rates lies along the line 286 and accurately corresponds to the known density. These points represent the general accuracy of the NGD determination for these formations 242. However, for formations 242 that have low porosity 288 or heavy elements 290, the calculated logarithm of neutron-transport-corrected gamma ray count rates lies below and above the line 286, respectively. Since the calculated logarithm of neutron-transport-corrected gamma ray count rates of these formations 242 with low porosity 288 or heavy elements 290 does not follow the same function of change with density as the other formations 242 (not falling along the line 286), NGD measurements for the low-porosity formations 288 or heavy element formations 290 obtained using the same (uncorrected) calculations as the other formations 242 may be inaccurate.

It is believed that insufficient fast neutron transport correction may be responsible for the inaccurate calculations for these low-porosity formations 288 and formations with heavy elements 290. While it is also believed that this insufficient fast neutron transport correction may be addressed by placing the neutron detectors 212, 214, 216A, and/or 216B in a different location within the LWD module 120, in the absence of such an option, other neutron transport corrections can be obtained by modifying, for example, the count rate(s) of neutrons 246, the count rate(s) of inelastic gamma rays 250, and/or the neutron transport correction function $f(CR_{neutron})$ in a suitable manner, such that the calculated logarithm of neutron-transport-corrected gamma ray count rates of the formations 242 that have low porosity 288 or heavy elements 290 are shifted to their proper placement along the line 286.

Figure 7:
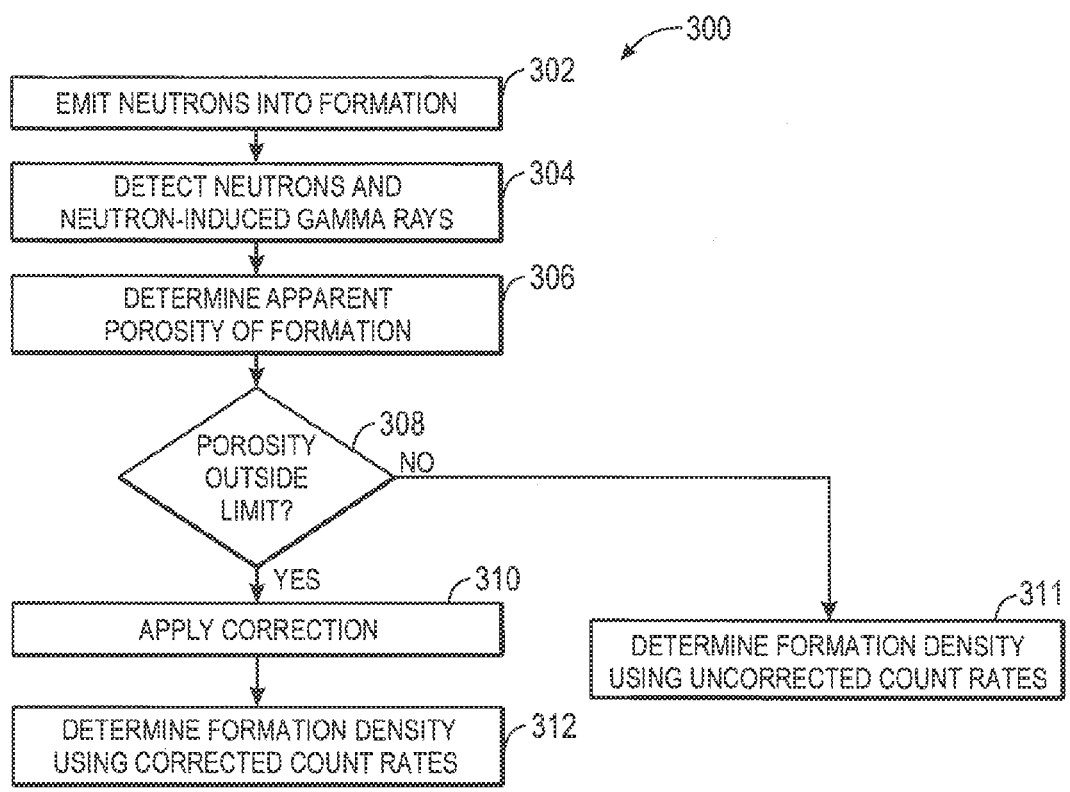
FIG. 7 is a flowchart describing an embodiment of a method for obtaining an accurate formation density measurement in a low-porosity formation.

A flowchart 300 of FIG. 7 represents one manner of determining a neutron-gamma density (NGD) measurement that can correct otherwise inaccurate density determinations for low-porosity formations 288. The flowchart 300 may begin while the LWD module 120 is in the borehole 244, as seen in FIG. 4. The neutron generator 206 may emit a burst of neutrons 246 into the formation 242 (block 302), which may inelastically scatter 248 off certain elements of the formation 242, generating inelastic gamma rays 250. Count rate(s) of neutrons 246 as well as count rate(s) of these neutron-induced inelastic gamma rays 250 may be obtained (block 304).

Block 306 and decision block 308 of the flowchart 300 generally involve determining whether the formation 242 is a low-porosity formation 288. As particularly shown in FIG. 7, the data processing circuitry 200 may determine an apparent porosity of the formation 242 using any suitable technique (block 306), and if the apparent porosity is outside of a defined limit (decision block 308), the data processing circuitry 200 may apply a correction to the count rate(s) of neutrons 246, the count rate(s) of inelastic gamma rays 250, and/or the neutron transport correction function $f(CR_{neutron})$ (block 310). The defined limit may be determined experimentally or through computer modeling, and may be predefined or determined by the data processing circuitry 200. As noted above, the data processing circuitry 200 may undertake any suitable correction of any of the terms of Equation (1), including the introduction of one or more additional correction term(s), that may cause the NGD measurement to be generally accurate for the formation 242. As will be discussed below, some of these modifications may be relatively specific modifications to the count rates of neutrons 246, which may be adjusted according to a piecewise linear function of the porosity of the formation 242 (e.g., see Equation (3) below). However, it should be understood that the present embodiments are not intended to be limited only to such a modification to the count rate of neutrons 246. Indeed, the present embodiments are intended to cover any suitable modifications to an NGD determination that is generally accurate for some formations 242 but may be less accurate in the presence of formations with low porosity and/or low hydrogen index.

If the data processing circuitry 200 does not determine that the apparent porosity of the formation 242 is outside of the defined limit (decision block 308), the data processing circuitry 200 may not apply such a correction. In any case, the data processing circuitry 200 may subsequently determine an NGD measurement of the formation 242 using the determined (corrected—block 312—or uncorrected—block 311—) count rate(s) of neutrons 246, the count rate(s) of inelastic gamma rays 250, and/or the neutron transport correction function $f(CR_{neutron})$. For example, as noted above, the data processing circuitry 200 may determine the NGD measurement based on the relationship represented by Equation (1).

In block 306, the data processing circuitry 200 may determine the apparent porosity according to any suitable technique, such as:
  Using an apparent porosity measurement obtained directly from other techniques used by the LWD module 120
  Using a count rate of an epithermal or fast neutron detector to infer apparent porosity
  Using a count rate ratio between two neutron detector count rates (preferably epithermal or fast neutron detectors) to infer the presence of low porosity
  Using a ratio between neutron capture count rates of two gamma ray detectors to infer apparent porosity
  Using a ratio between the inelastic count rates of two gamma ray detectors to infer apparent porosity
  Using a ratio of count rates from a neutron detector and a gamma ray detector to infer apparent porosity
  Using a function of neutron and/or gamma ray count rates to infer apparent porosity As should be understood, the count rates used to determine the apparent porosity of the formation 242 may have to be normalized to the neutron output of the neutron generator 206 if the count rates are used alone. Since ratios of count rates account for variations in the neutron output, normalization to the neutron output of the neutron generator 206 may not be necessary when ratios of count rates are used to determine apparent porosity.

One specific manner of carrying out blocks 306, 308, and 310 of the flowchart 300 of FIG. 7 may involve correcting the neutron count rate $CR_{neutron}$ used in the neutron transport correction function $f(CR_{neutron})$ In particular, the apparent porosity of the formation 242 may be determined from the (normalized) count rate of the epithermal neutron detector 214 $CR_{neutron}$ (block 306). The low porosity condition of the formation 242 may be indicated if the epithermal neutron count rate $CR_{neutron}$ exceeds a certain value $CR_{limit}$ or falls within a certain range of values (decision block 308). In that case, the neutron count rate in the neutron transport correction $CR_{neutron}$ may be corrected (block 310). The corrected epithermal neutron count rate $CR_{neutron,corrected}$ can take the following form:

$$CR_{neutron,corrected} = CR_{neutron}(1 + g(CR_{limit}, CR_{neutron}) \cdot F(CR_{neutron}, CR_{inel}^{\gamma})) \quad (3).$$

Using Equation (3), the corrected epithermal neutron count rate $CR_{neutron,corrected}$ can be determined based on a neutron count rate correction function $F(CR_{neutron}, CR_{inel}^{\gamma})$, weighted by a weighting function $g(CR_{limit}, CR_{neutron})$. In this example, the neutron count rate correction function $F(CR_{neutron}, CR_{inel}^{\gamma})$ is a function of the epithermal neutron count rate from the epithermal neutron detector 214 and an inelastic gamma ray count rate of one or more of the gamma ray detectors 218 and 220. The strength of the neutron count rate correction function $F(CR_{neutron}, CR_{inel}^{\gamma})$ is weighted by the weighting function $g(CR_{limit}, CR_{neutron})$, which can be a constant value, an affine function, or any suitable function derived from modeled and/or measured data. The neutron count rate correction function $F(CR_{neutron}, CR_{inel}^{\gamma})$ may take any suitable form, including a constant or the following form:

$$F(CR_{neutron}, CR_{inel}^{\gamma}) = a_1 + a_2 CR_{neutron} + a_3 CR_{neutron}^2 + b_1 + b_2 CR_{inel}^{\gamma} + b_3 CR_{inel}^{\gamma 2},$$

where the coefficients $a_1$, $a_2$, and $a_3$ and $b_1$, $b_2$, and $b_3$ represent coefficients determined, for example, through characterization measurements and nuclear modeling.

Figure 8:
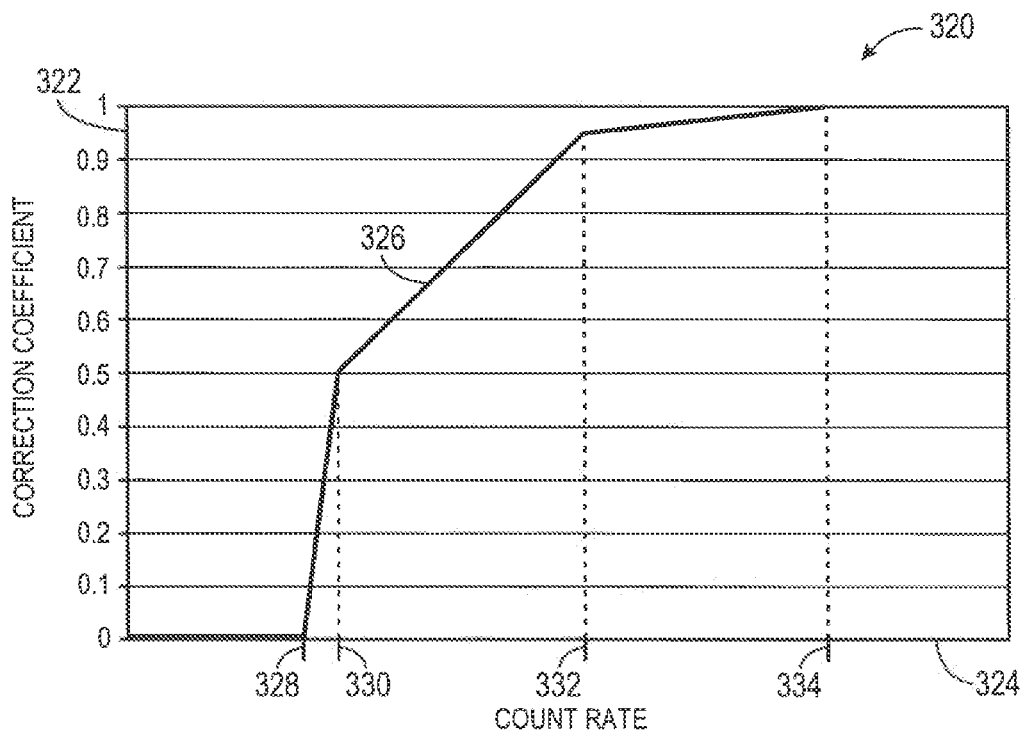
FIG. 8 is a plot modeling a weighting function used for determining a corrected neutron count rate in a low-porosity formation, in accordance with an embodiment.

In some embodiments, the weighting function $g(CR_{limit}, CR_{neutron})$ may be a piecewise linear function composed of two or more straight lines between different count rate limits $CR_{limit}$, depending on the neutron count rate $CR_{neutron}$ that needs to be corrected. For example, the weighting function $g(CR_{limit}, CR_{neutron})$ may be a piecewise linear function such as illustrated by a plot 320 of FIG. 8. In the plot 320, an ordinate 322 represents a resulting correction coefficient from 0 to 1, and an abscissa 324 represents the neutron count rate $CR_{neutron}$.

A piecewise curve 326 in the plot 320 illustrates various linear weighting functions that may be applied at different count rate limits $CR_{limit}$, shown at numerals 328, 330, 332, and 334. Thus, in the plot 320, when the neutron count rate $CR_{neutron}$ is less than the first limit 328, the correction coefficient may be 0 and no correction to the neutron count rate $CR_{neutron}$ may be applied in the resulting corrected epithermal neutron count rate $CR_{neutron,corrected}$. Between the first limit 328 and the second limit 330, the correction coefficient may rapidly increase from 0 to 0.5, with subsequent linear functions between the other limits 332 and 334 slowly leveling off. Above the fourth limit 334, the correction coefficient may be 1, and thus the entire neutron count rate correction function $F(CR_{neutron}, CR_{inel}^{\gamma})$ may be applied in the resulting corrected epithermal neutron count rate $CR_{neutron,corrected}$.

Figure 9:
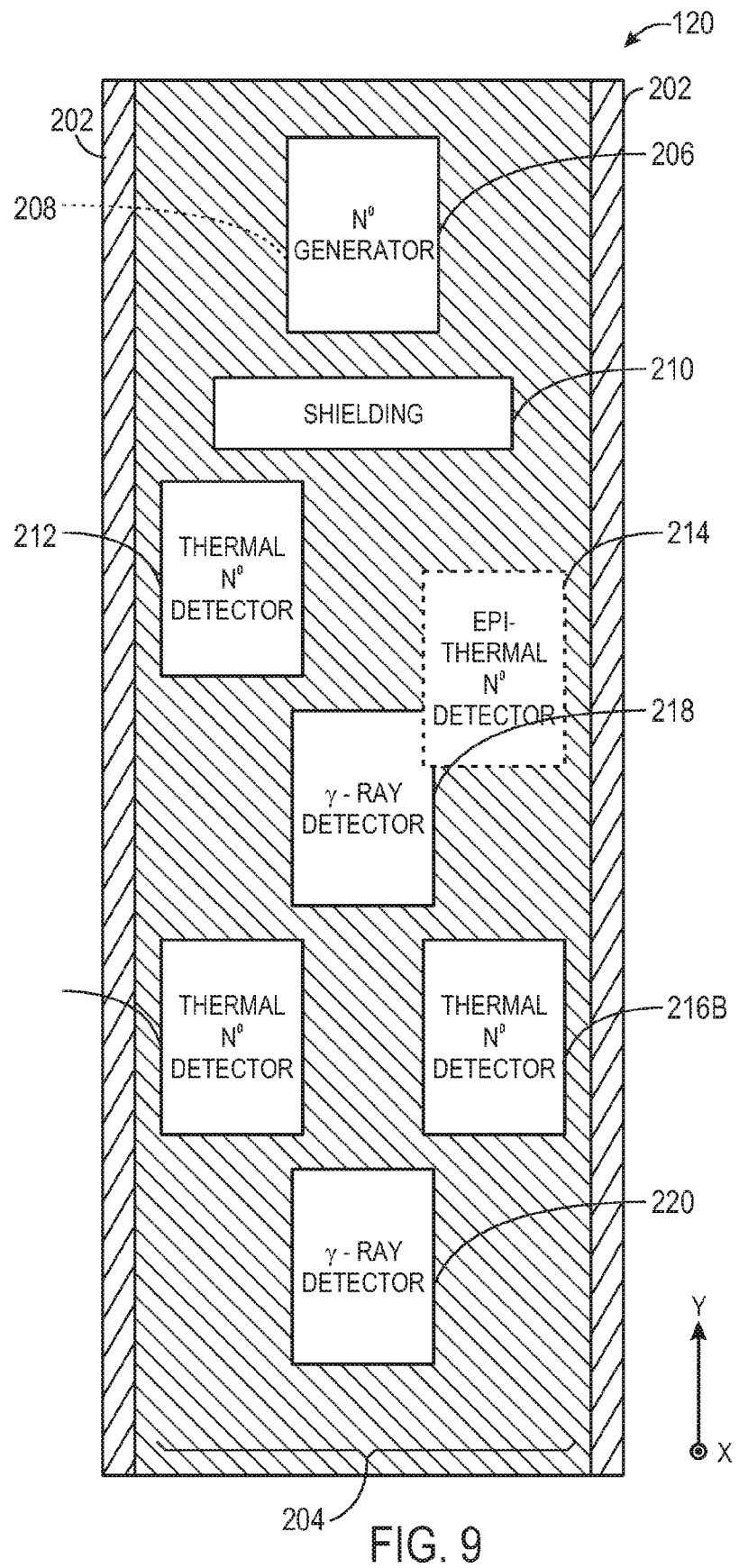
FIG. 9 is a schematic block diagram illustrating a manner of visualizing the effect of the process of FIG. 7, in accordance with an embodiment.

Such a neutron count rate correction can be considered as an addition of neutron counts to $CR_{neutron}$. One manner of visualizing the effect of this correction appears in FIG. 9, in which the measuring point of the epithermal neutron detector 214 may be virtually moved to a spacing more distant from the neutron generator 206. It should be noted that the epithermal neutron detector 214 is virtually moved to the spacing more distant from the neutron generator 206 because the gamma ray detector 218 and/or 220 that obtains the inelastic gamma ray count rate $CR_{inelas}^{\gamma}$, used in the neutron count rate correction function $F(CR_{neutron}, CR_{inel}^{\gamma})$, is at a farther spacing than the true spacing of the epithermal neutron detector 214. By effectively moving the virtual measurement point of the epithermal neutron detector 214 at low porosities, the sensitivity of the epithermal neutron count rate $CR_{neutron}$ may virtually increase at low porosities to more accurately account for the fast neutron transport of low-hydrogen-index or low-porosity formations 242.

It should be appreciated that in larger boreholes 244, the neutron count rate may also be affected by standoff and may have to be corrected accordingly for such standoff. Such a standoff correction can be based on a known standoff from a different measurement. Also, at least in deviated wells, it may be advantageous to use the neutron count rate from the bottom quadrant as an input, instead of the average count rate, since the bottom quadrant may be less affected by standoff. For small to moderate standoffs (up to 1 in) the standoff can also be determined from the neutron slowing down time measured by an epithermal detector as described by U.S. Pat. No. 4,760,252, which is assigned to Schlumberger Technology Corporation and incorporated by reference herein in its entirety.

Figure 10:
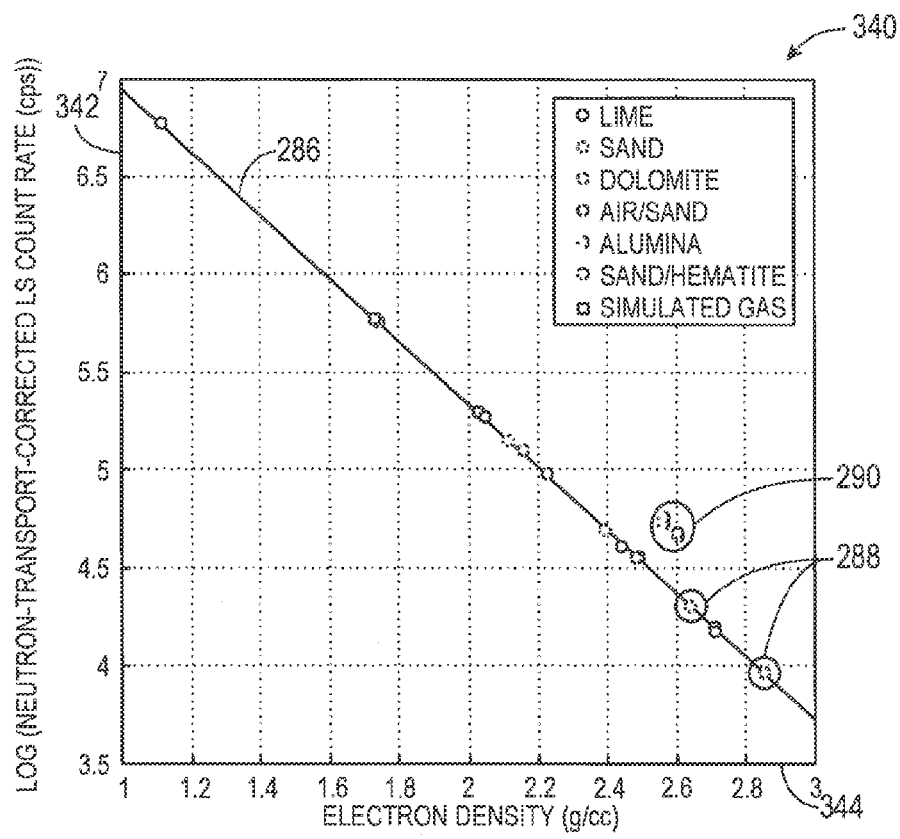
FIG. 10 is a crossplot comparing known formation density against formation density obtained after correcting neutron count rates for low-porosity formations, in accordance with an embodiment.

When corrected for neutron transport according to the flowchart 300 of FIG. 7, the NGD measurements of low-porosity formations 288 may more accurately match those of other formations 242. A crossplot 340 of FIG. 10 represents a crossplot modeling the known density of a variety of types of formations 242 against an NGD measurement for the formations 242 obtained using Equation (1) for which the count rate(s) of neutrons 246 has been corrected in the presence of low hydrogen index or low porosity. Like the crossplot 280 of FIG. 6, in the crossplot 340 of FIG. 10, an ordinate 342 represents the logarithm of a neutron-transport-corrected gamma ray count rate as detected by the LS gamma ray detector 218, and an abscissa 344 represents electron density of the formation 242 in units of g/cc. A legend indicates various types of formations 242 that have been modeled in the crossplot 340, which matches those of the crossplot 280, including limestone, sandstone, dolomite, sandstone with air-filled pores, alumina, sandstone with hematite, and simulated gas. The line 286 represents an accurate correlation between the neutron-transport-corrected gamma ray count rate and the known density of the formations 242.

As seen in the crossplot 340, when the neutron count rate used in the neutron transport correction is adjusted in low porosities (e.g., according to Equation (3)), the neutron-transport-corrected gamma ray count rates for the low-porosity formations 288 may move into alignment with most of the other formations 242 along the line 286. Since, in the plot 340 of FIG. 10, the neutron-transport-corrected gamma ray count rates have not been corrected to account for the fast neutron transport of the formations with heavy elements 290, the neutron-transport-corrected gamma ray count rates of the formations with heavy elements 290 lie above the line 286 and remain inaccurate. As should be understood, any suitable alternative manner of causing the neutron-transport-corrected gamma ray count rates of the low-porosity formations 288 to move into alignment with the line 286 may be used. That is, when obtaining an NGD measurement when the formation 242 is a low-hydrogen-index formation or low-porosity formation 288, the data processing circuitry 200 may apply any suitable correction to the count rate(s) of neutrons 246, the count rate(s) of inelastic gamma rays 250, and/or the neutron transport correction function $f(CR_{neutron})$ to cause the neutron-transport-corrected gamma ray count rates of the low-porosity formations 288 to move into alignment with the line 286.

As mentioned above and as seen in the plot 340 of FIG. 10, it is believed that insufficient fast neutron transport correction can also be responsible for the inaccurate calculations for the formations with heavy elements 290. It is also believed that this insufficient fast neutron transport correction may be addressed by using a fast neutron detector in lieu of the epithermal neutron detector 214. However, while a fast neutron detector may be desirable, it may not be easy to implement such a device in a downhole tool such as the LWD module 120. For example, it may be difficult to find a suitable fast neutron detector that is capable of working downhole. Such a fast neutron detector may benefit from high sensitivity, be compact enough to fit in the LWD module 120, and be insensitive to the presence of the gamma rays 250. Additionally, since the LWD module 120 in particular, and most nuclear downhole tools in general, may not be limited to their use for obtaining only a single measurement, multiple different types of radiation detectors may be employed in such a tool (e.g., the neutron detectors 212, 214, 216A, and/or 216B and the gamma ray detectors 218 and 220). Increasing the number of radiation detectors may not only increase the cost of the LWD module 120 and/or the length of the LWD module 120 or other downhole tool, but these multiple radiation detectors may compete for the same physical position within the LWD module 120 or other downhole tool (e.g., multiple radiation detectors may benefit from similar spacing from the neutron generator 206 and similar radial positions). Instead, the LWD module 120 may use the epithermal neutron detector 214 as a proxy for determining the extent of the fast neutron distribution, since the epithermal neutron detector 214 can also contribute to additional tool answers like neutron porosity, slowing down time, and so forth.

When the LWD module 120 contains no fast neutron detector, a fast neutron signal may be estimated or derived from existing responses from the other neutron detectors 212, 214, 216A, and/or 216B and/or the gamma ray detectors 218 and/or 220. Since inelastic scattering reactions take place only at high neutron energies (e.g., greater than 2 MeV), a plausible high-neutron-energy signal can be derived from the following ratio:

$$Fastn = \frac{CR_{net-inelastic}^{SSn}}{CR_{net-inelastic}^{LSn}}, \quad (4)$$

where $CR_{net-inelastic}^{SSn}$ represents the net inelastic gamma ray count rate obtained from the short-spaced (SS) gamma ray detector 218, and $CR_{net-inelastic}^{LSn}$ represents the net inelastic gamma ray count rate from the long-spaced (LS) gamma ray detector 220.

The net inelastic gamma ray count rates $CR_{net-inelastic}^{SSn}$ and $CR_{net-inelastic}^{LSn}$ generally may be computed in the same manner, for example, as follows:

$$CR_{net-inelastic} = CR_{burst} - CR_{ec} - \alpha CR_{lc} \quad (5),$$

where $CR_{burst}$, $CR_{ec}$, and $CR_{lc}$ represent gamma ray count rates from the burst, early capture, and late time gates, respectively, of the gamma ray detectors 218 and/or 220, and $\alpha$ is a constant. As should be appreciated, in some embodiments the burst gate may represent a period of time while the neutron generator 206 is emitting neutrons (e.g., 10 μs), the early capture gate may represent a second period of time following the burst gate (e.g., 5 μs), and the late time gate may represent a third period of time following the early capture gate (e.g., 20 μs). As mentioned above, the computation of the net inelastic count rate for both the SS gamma ray detector 218 and the LS gamma ray detector 220 may be performed using any suitable technique, including the computation illustrated by Equation (5). For example, additionally or alternatively, the inelastic gamma ray count rates may be determined according to the techniques disclosed by U.S. Provisional Patent Application Ser. No. 61/180,547, entitled "Optimization of Neutron-Gamma Tools for Inelastic Gamma ray Logging" and filed on May 22, 2009, which is incorporated by reference herein in its entirety. Moreover, it should be understood that additional coefficients or functions may modify the $CR_{ec}$ and $CR_{lc}$ terms of Equation (5). Such coefficients may be constants or may depend on other measurements of the formation 242, such as porosity or sigma.

The Fastn ratio shown above is just one way of obtaining a measurement of the extent of the fast neutron flux through the formation 242. Other ways to obtain such a measurement related to the fast neutron flux may include, for example, using the ratios of one of the inelastic gamma ray count rates from one of the gamma ray detectors 218 or 220, and the neutron count rate of one of the neutron detectors 212, 214, 216A, and/or 216B to arrive at Fastn. It should be understood that the neutron detector 212, 214, 216A, and/or 216B from which the neutron count rate is obtained could be a detector of fast neutrons or of epithermal neutrons.

Figure 11:
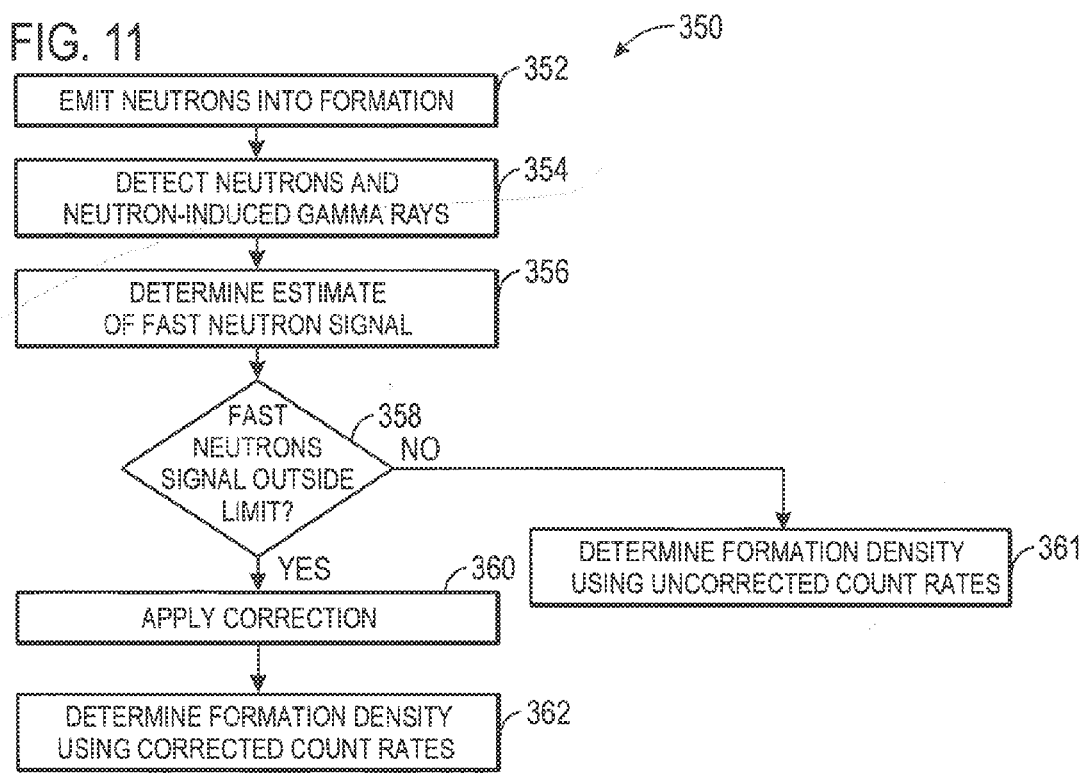
FIG. 11 is a flowchart describing an embodiment of a method for obtaining an accurate formation density measurement in a formation that includes heavy elements.

The Fastn signal may indicate when to apply a correction to the count rate(s) of neutrons 246, the count rate(s) of inelastic gamma rays 250, and/or the neutron transport correction function $f(CR_{neutron})$ to generate an accurate NGD measurement for the formations with heavy elements 290, as shown by a flowchart 350 of FIG. 11. The flowchart 350 may begin while the LWD module 120 is in the borehole 244, as seen in FIG. 4. The neutron generator 206 may emit a burst of neutrons 246 into the formation 242 (block 352), which may inelastically scatter 248 off certain elements of the formation 242, generating inelastic gamma rays 250. Count rate(s) of neutrons 246 as well as count rate(s) of these neutron-induced inelastic gamma rays 250 may be obtained (block 354).

Using any suitable technique, such as provided by Equation (4), the data processing circuitry 200 may determine a fast neutron correction ratio Fastn (block 356). If the Fastn signal falls outside of a defined limit (decision block 358), the data processing circuitry 200 may apply a correction to the count rate(s) of neutrons 246, the count rate(s) of inelastic gamma rays 250, and/or the neutron transport correction function $f(CR_{neutron})$ (block 360). The defined limit may be determined experimentally or through computer modeling, and may be predefined or determined by the data processing circuitry 200. If the data processing circuitry 200 does not determine that the Fastn signal is outside of the defined limit (decision block 308), the data processing circuitry 200 may not apply such a correction. In any case, the data processing circuitry 200 may subsequently determine an NGD measurement of the formation 242 using the determined (corrected—block 362—or uncorrected—block 361—) count rate(s) of neutrons 246, the count rate(s) of inelastic gamma rays 250, and/or the neutron transport correction function $f(CR_{neutron})$. For example, as noted above, the data processing circuitry 200 may determine the NGD measurement based on the relationship represented by Equation (1).

The correction to the count rate(s) of neutrons 246, the count rate(s) of inelastic gamma rays 250, and/or the neutron transport correction function $f(CR_{neutron})$ that is applied in block 360 may depend on the fast neutron correction ratio Fastn. However, the relationship between the fast neutron correction ratio Fastn and the formations with heavy elements 290 may not immediately be apparent. Indeed, in a plot 370 in FIG. 12, which plots the fast neutron correction ratio Fastn against the electron density for a variety of formations 242, the results for the formations with heavy elements 290 appear to be very similar to those of other formations 242.

Figure 12:
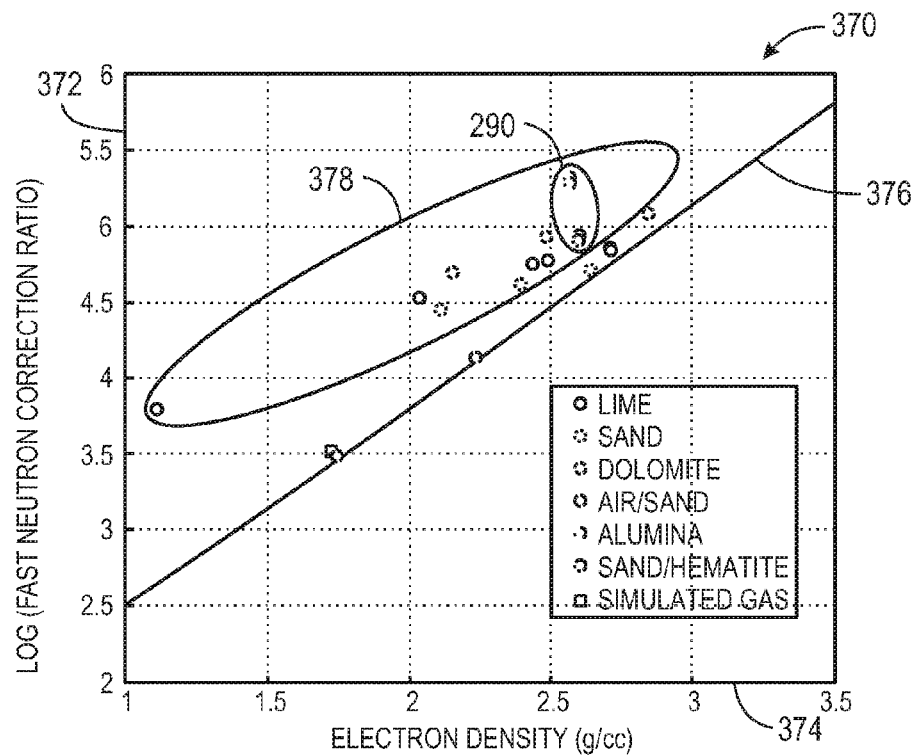
FIG. 12 is a plot modeling a comparison between a fast neutron correction ratio and electron density, in accordance with an embodiment.

In the plot 370 of FIG. 12, an ordinate 372 represents the logarithm of the fast neutron correction ratio Fastn, and an abscissa 374 represents the electron density of the formation 242 in units of g/cc. A legend indicates various types of formations 242 that have been modeled in the plot 370, which matches those of the respective crossplots 280 and 340 of FIGS. 6 and 10, including limestone, sandstone, dolomite, sandstone with air-filled pores, alumina, sandstone with hematite, and simulated gas. Situated along a line 376 are the results for formations 242 with relatively low hydrogen index, while the collection of results indicated by numeral 378 are associated with formations 242 with relatively high hydrogen index. Since the results for the formations with heavy elements 290 appear among the collection of results indicated by the numeral 378, the fast neutron correction ratio Fastn does not appear to differentiate the formations with heavy elements 290 from the other formations 242 indicated by the numeral 378.

However, a relationship emerges when the data of FIG. 12 is re-plotted according to the effective density of the formations 242, where effective density $\rho_{effective}$ is defined as follows:

$$\rho_{effective} = \rho_{electron} \cdot k \cdot HI \quad (6),$$

where HI represents hydrogen index and k represents a constant. In one embodiment, the hydrogen index HI value may be estimated through a ratio of neutron count rates from one or more of the near neutron detectors 212 and/or 214 to one or more of the far neutron detectors 216A and/or 216B (Near/Far). Thus, the effective density $\rho_{effective}$ computed in the manner of Equation (6) includes the effects of both neutron and gamma ray attenuation in the formation 242. The effective density $\rho_{effective}$ therefore represents a density that includes in the first term, effects from gamma-scattering (electron density) and in the second term, hydrogen index (slow neutron) effects. This correction may account for the remaining hydrogen index dependence in the computation of the fast-neutron correction ratio Fastn and, hence, also in the NGD measurement.

Figure 13:
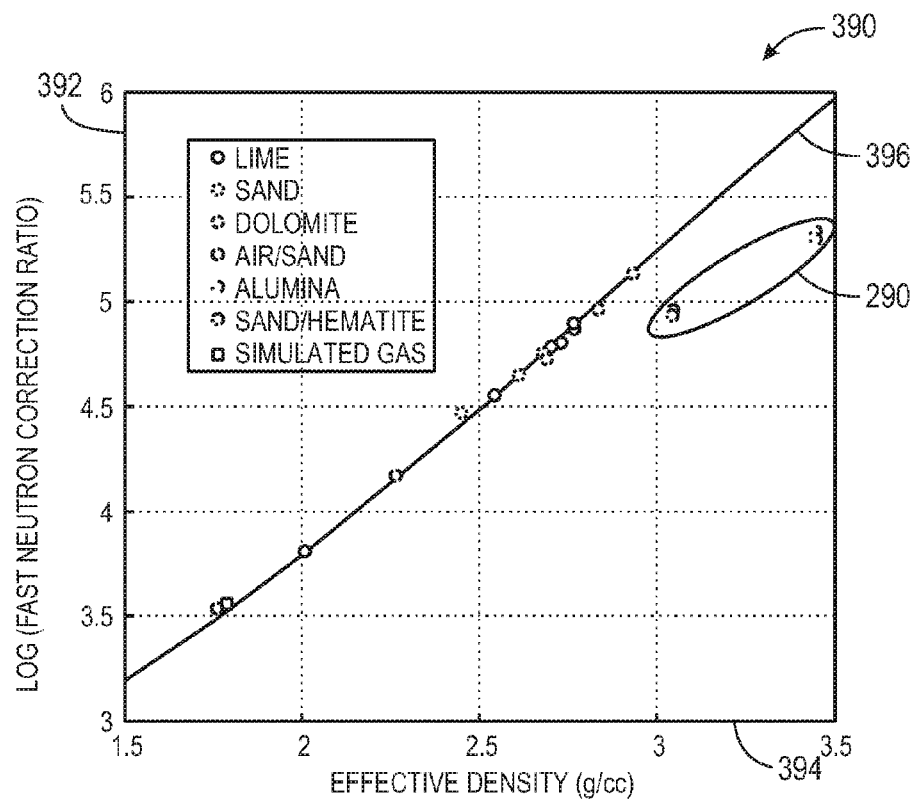
FIG. 13 is a plot modeling a comparison between a fast neutron correction ratio and effective density, in accordance with an embodiment.

In a plot 390 of FIG. 13, which re-plots the data of FIG. 12 according to effective density instead of electron density, the formations with heavy elements 290 are clear outliers. In the plot 390 of FIG. 13, an ordinate 392 represents the logarithm of the fast neutron correction ratio Fastn, and an abscissa 394 represents the effective density of the formations 242 in units of g/cc, as determined through Equation (6). A legend indicates various types of formations 242 that have been modeled in the plot 390, including limestone, sandstone, dolomite, sandstone with air-filled pores, alumina, sandstone with hematite, and simulated gas. Situated along a reference line 396 are the results for all formations 242 except the formations with heavy elements 290. That is, most of the points fall on or very close to the reference line 396 regardless of the content of the pore spaces of the formations 242. That is, results for both liquid-filled formations and dry (hydrogen-free) formations 242 fall on the same line, the exception being the formations with heavy elements 290 that contain aluminum and/or iron. As clearly seen in the plot 390, there is very good differentiation between formations 242 that contain no aluminum or iron and those that do.

Figure 14:
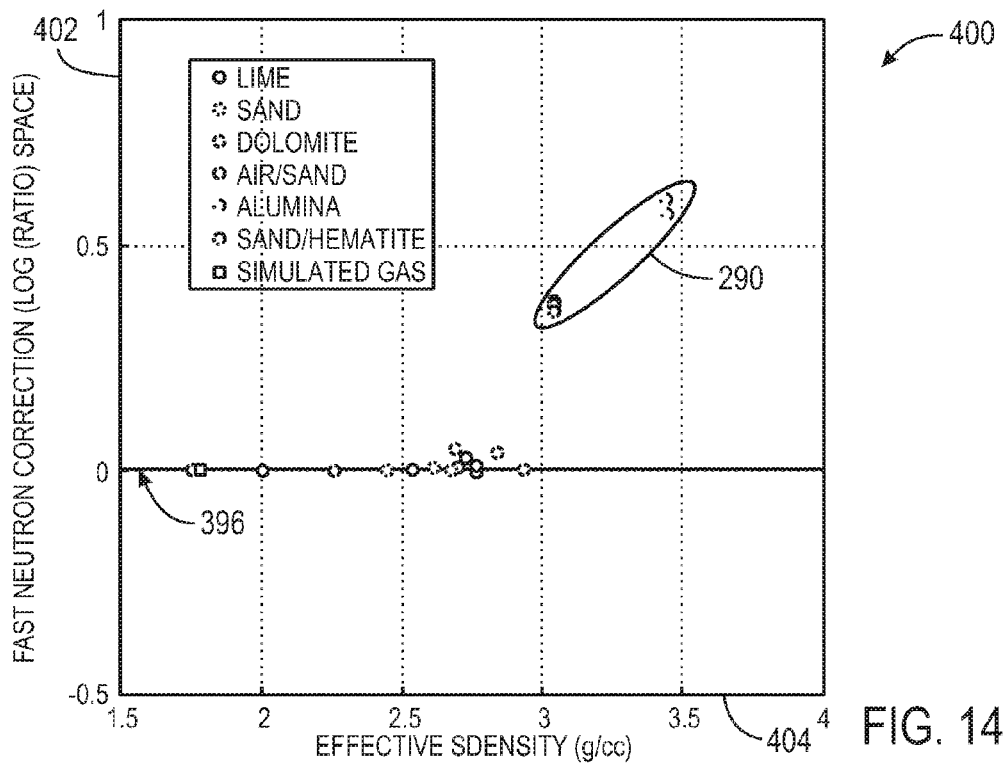
FIG. 14 is a plot modeling a difference between a fast neutron correction ratio and effective density, in accordance with an embodiment.

From the plot 390 of FIG. 13, it should be apparent that the correction of block 360 of FIG. 11 may be determined by computing the difference between the points at which the formations with heavy elements 290 are located and the value at the reference line 396 (for the same effective density). A plot 400 of FIG. 14 re-plots the data shown in FIG. 13 to make this relationship more clear, having an ordinate 402 representing the fast neutron correction in log(Fastn) space and an abscissa 404 representing effective density. As such, the distance of the results of the formations with heavy elements 290 from the reference line 396 may be more clearly seen. Thus, the correction of block 360 of FIG. 11 may be any correction of the count rate(s) of neutrons 246, the count rate(s) of inelastic gamma rays 250, and/or the neutron transport correction function $f(CR_{neutron})$ so as to cause the formations with heavy elements 290 to align along the reference line 396.

It should be appreciated that, in addition to allowing for a more accurate NGD measurement for formations with heavy elements 290, the fast neutron correction ratio Fastn may also be used as a shale indicator. That is, because the fast neutron correction ratio Fastn may be used to indicate the presence of aluminum and/or iron, for example, the fast neutron correction ratio Fastn may be used in conjunction with other shale indicators (e.g., natural gamma ray, natural gamma ray spectroscopy, capture and inelastic spectroscopy, neutron activation, sigma, and so forth) to refine the analysis of the formation lithology.

Figure 15:
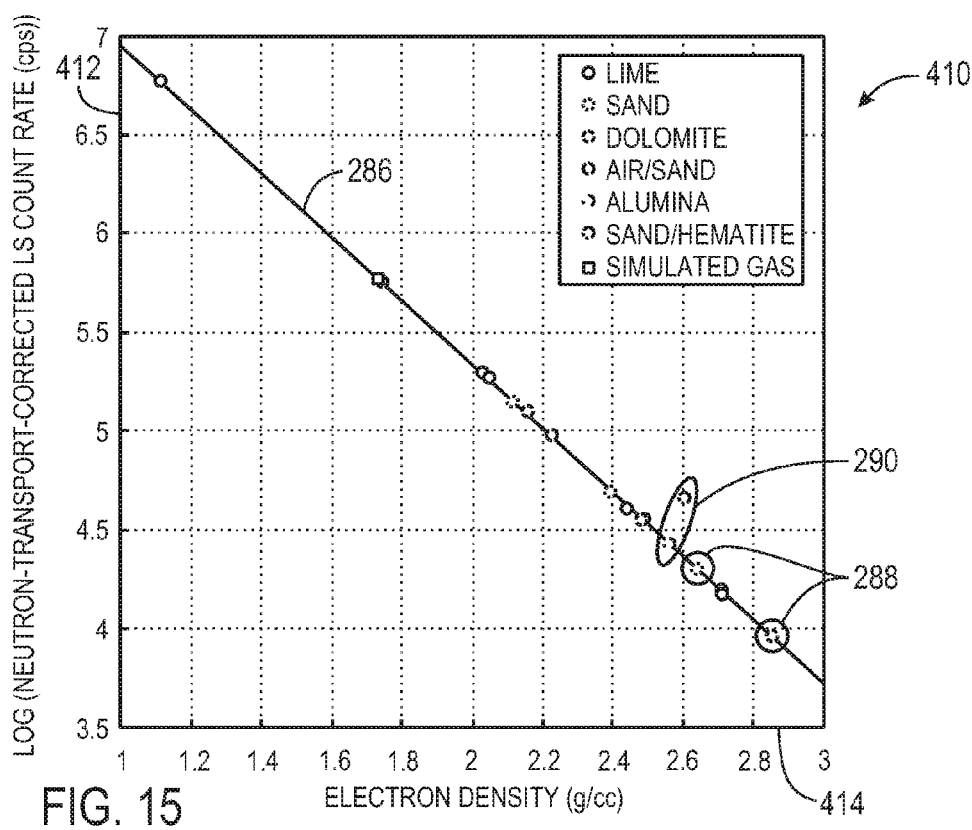
FIG. 15 is a crossplot comparing known formation density against formation density obtained after applying additional corrections for low-porosity formations and formations with heavy elements, in accordance with an embodiment.

Following the above-described techniques, the various formations 242 plotted in the crossplots 280 and 340 above all may be corrected and substantially accurate, despite variations in fast neutron transport in low-hydrogen-index and/or low-porosity formations 288 and formations with heavy elements 290, as represented by a crossplot 410 of FIG. 15. In the crossplot 410, an ordinate 412 represents the logarithm of a neutron-transport-corrected gamma ray count rate as detected by the LS gamma ray detector 218, and an abscissa 414 represents the electron density of the formations 242 in units of g/cc. A legend indicates various types of formations 242 that have been modeled in the crossplot 410, including limestone, sandstone, dolomite, sandstone with air-filled pores, alumina, sandstone with hematite, and simulated gas. Notably, substantially all of the results for the formations 242 modeled in the crossplot 410 fall along the line 286, which represents an accurate correlation between the neutron-transport-corrected gamma ray count rate and the known formation density. Although not all of the results for the formations with heavy elements 290 may fall exactly along the line 286, the results for the formations with heavy elements 290 are improved by applying the correction.

Technical effects of the present disclosure include the accurate determination of a neutron-gamma density (NGD) measurement for a broad range of formations, including formations with low hydrogen index or low porosity and formations with heavy elements. These NGD measurements may remain accurate even when the configuration of a downhole tool used to obtain the neutron count rates and gamma ray count rates used in the NGD measurement does not have an optimal configuration. Thus, despite the lack of a fast neutron detector or despite that a neutron detector may be placed in a suboptimal spacing from the neutron source, an accurate NGD measurement still may be obtained using the systems and techniques disclosed above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole tool comprising:
   a neutron generator configured to emit neutrons into a formation at an energy superior to 2 MeV, sufficient to cause some of the neutrons to inelastically scatter off elements of the formation, creating inelastic gamma rays;
   a neutron detector configured to detect a count rate of neutrons that return to the downhole tool;
   a first gamma ray detector configured to detect a first count rate of inelastic gamma rays that Compton scatter through the formation to reach the downhole tool, wherein the first gamma ray detector is spaced a first distance from the neutron generator;
   a second gamma ray detector configured to detect a second count rate of gamma rays that Compton scatter through the formation to reach the downhole tool, wherein the second gamma ray detector is spaced a second distance from the neutron generator; and
   data processing circuitry configured to:
      receive the count rate of neutrons, the first count rate of inelastic gamma rays, and the second count rate of inelastic gamma rays;
      determine an apparent porosity of the formation or an estimate of a fast neutron signal that would be detected by a fast neutron detector were the fast neutron detector present in the downhole tool, wherein the estimate of the fast neutron signal is determined based at least in part on:
         the count rate of neutrons, or
         the first count rate of inelastic gamma rays, or
         the second count rate of inelastic gamma rays, or
         a combination thereof;
      when the apparent porosity of the formation is less than a porosity limit or when the estimate of the fast neutron transport of the formation is outside a fast neutron transport limit, apply a respective correction to:
         the count rate of neutrons, or
         the first count rate of inelastic gamma rays, or
         the second count rate of inelastic gamma rays, or
         a neutron transport correction function relating the count rate of neutrons to the fast neutron transport of the formation, or
         a combination thereof; and
      determine a density of the formation based at least in part on the corrected count rate of neutrons, the corrected first count rate of inelastic gamma rays, the corrected second count rate of inelastic gamma rays, or the corrected neutron transport correction function, or a combination thereof.

2. The downhole tool of claim 1, wherein the neutron detector comprises an epithermal neutron detector, wherein the count rate of neutrons comprises a count rate of epithermal neutrons.

3. The downhole tool of claim 1, wherein the data processing circuitry is configured to determine the apparent porosity based at least in part on:
   the count rate of neutrons;
   a ratio between the count rate of neutrons and another count rate of neutrons;
   a ratio between two count rates of neutron capture gamma rays;
   a ratio between the first count rate of inelastic gamma rays and the second count rate of inelastic gamma rays;
   a ratio between the count rate of neutrons and the first count rate of inelastic gamma rays, the second count rate of inelastic gamma rays, or a combination thereof;
   a function of the count rate of neutrons and the first count rate of inelastic gamma rays, the second count rate of inelastic gamma rays, or a combination thereof; or
   other techniques used by the downhole tool; or
   a combination thereof.

4. The downhole tool of claim 1, wherein the data processing circuitry is configured to apply the correction so as to cause the count rate of neutrons, the first count rate of inelastic gamma rays, the second count rate of inelastic gamma rays, or the neutron transport correction function, or the combination thereof, to more accurately relate to the true density of the formation.

5. The downhole tool of claim 1, wherein the data processing circuitry is configured to apply the correction by including a neutron count rate correction to the count rate of neutrons, wherein the neutron count rate correction adds an amount to the count rate of neutrons that accounts for a variation in fast neutron transport occurring in formations having a porosity beneath the porosity limit of apparent porosity.

6. The downhole tool of claim 1, wherein the data processing circuitry is configured to apply the correction by adding a neutron count rate correction to the count rate of neutrons in an amount that varies based at least in part on the apparent porosity of the formation.

7. The downhole tool of claim 1, wherein the data processing circuitry is configured to apply the correction by adding a neutron count rate correction to the count rate of neutrons, wherein the neutron count rate correction is determined based at least in part on a secondary neutron transport correction function and a weighting function, wherein the secondary neutron transport correction function is dependent on the count rate of neutrons and the first count rate of inelastic gamma rays, the second count rate of inelastic gamma rays, or a combination thereof, and the weighting function is dependent on the count rate of neutrons and a count rate limit.

8. The downhole tool of claim 7, wherein the weighting function is a piecewise linear function comprising two or more straight lines between different values of the count rate of neutrons, a constant value, or an affine function, or a combination thereof.

9. The downhole tool of claim 1, wherein the data processing circuitry is configured to apply the correction by determining a corrected count rate of neutrons, wherein the corrected count rate of neutrons is determined according to the following relationship:

$$CR_{neutron,corrected} = CR_{neutron}(1+g(CR_{limit}, CR_{neutron}) \cdot F(CR_{neutron}, CR_{inel}^{\gamma})),$$

where $CR_{neutron,corrected}$ represents the corrected count rate of neutrons, $CR_{neutron}$ represents the count rate of neutrons, $CR_{limit}$ represents a limit of the count rate of neutrons corresponding to the porosity limit, $CR_{inel}^{\gamma}$ represents the first count rate of inelastic gamma rays or the second count rate of inelastic gamma rays, or a combination thereof, $F(CR_{neutron}, CR_{inel}^{\gamma})$ represents a neutron transport correction function, and $g(CR_{limit}, CR_{neutron})$ represents a weighting function.

10. The downhole tool of claim 1, wherein the data processing circuitry is configured to determine the estimate of the fast neutron signal based at least in part on a ratio of the first count rate of inelastic gamma rays and the second count rate of inelastic gamma rays.

11. The downhole tool of claim 1, wherein the data processing circuitry is configured to determine the estimate of the fast neutron signal based at least in part on the following relationship:

$$Fastn = \frac{CR_{net-inelastic}^{SSn}}{CR_{net-inelastic}^{LSn}},$$

where Fastn represents the fast neutron signal, $CR_{net-inelastic}^{SSn}$ represents the first count rate of inelastic gamma rays, and $CR_{inelastic}^{LSn}$ represents the second count rate of inelastic gamma rays.

12. The downhole tool of claim 1, wherein the first count rate of inelastic gamma rays or the second count rate of inelastic gamma rays, or both the first count rate of inelastic gamma rays and the second count rate of inelastic gamma rays, are determined based at least in part on gamma ray count rates respectively obtained during burst, early capture, and late time gates.

13. The downhole tool of claim 1, wherein the data processing circuitry is configured to determine the first count rate of inelastic gamma rays or the second count rate of inelastic gamma rays, or both the first count rate of inelastic gamma rays and the second count rate of inelastic gamma rays, are determined based at least in part on the following relationship:

$$CR_{net-inelastic} = CR_{burst} - CR_{ec} - \alpha CR_{lc},$$

where $CR_{net-inelastic}$ represents the first count rate of inelastic gamma rays or the second count rate of inelastic gamma rays, or both the first count rate of inelastic gamma rays and the second count rate of inelastic gamma rays, $CR_{burst}$ represents a gamma ray count rate obtained during a burst time gate, $CR_{ec}$ represents a gamma ray count rate obtained during an early capture time gate, $CR_{lc}$ represents a gamma ray count rate obtained during a late time gate, and $\alpha$ represents a constant.

14. The downhole tool of claim 1, wherein the data processing circuitry is configured to determine the estimate of the fast neutron signal based at least in part on a ratio between the first count rate of inelastic gamma rays or the second count rate of inelastic gamma rays and the count rate of neutrons.

* * * * *